US011927030B2

(12) United States Patent
Corbin et al.

(10) Patent No.: US 11,927,030 B2
(45) Date of Patent: Mar. 12, 2024

(54) HANDLE ASSEMBLY FOR OPENING LEAVES OF THE WINDOW OR DOOR TYPE

(71) Applicants: THE USE FACTORY, Cairon (FR); IDS, Jausiers (FR)

(72) Inventors: Jean-Yves Corbin, Le Fresne Camilly (FR); Jean-Luc Ricevuto, Saint François (FR); Mathias D'Estais, Caen (FR)

(73) Assignees: THE USE FACTORY, Cairon (FR); IDS, Jausiers (FR)

( * ) Notice: Subject to any disclaimer, the term of this patent is extended or adjusted under 35 U.S.C. 154(b) by 422 days.

(21) Appl. No.: 17/282,964

(22) PCT Filed: Oct. 4, 2019

(86) PCT No.: PCT/EP2019/076930
§ 371 (c)(1),
(2) Date: Apr. 5, 2021

(87) PCT Pub. No.: WO2020/074393
PCT Pub. Date: Apr. 16, 2020

(65) Prior Publication Data

US 2021/0372159 A1 Dec. 2, 2021

(30) Foreign Application Priority Data

Oct. 12, 2018 (FR) ....................................... 1859489

(51) Int. Cl.
*E05B 3/04* (2006.01)
*E05B 15/00* (2006.01)
*E05B 63/00* (2006.01)

(52) U.S. Cl.
CPC ............ *E05B 3/04* (2013.01); *E05B 15/0033* (2013.01); *E05B 63/006* (2013.01)

(58) Field of Classification Search
CPC ..... E05B 3/00; E05B 3/04; E05B 3/10; E05B 79/06; E05B 15/00; E05B 15/0033; E05B 63/00; E05B 63/006; E05B 9/045
(Continued)

(56) References Cited

U.S. PATENT DOCUMENTS 2,864,642 A * 12/1958 Murphy .................... E05B 3/04
292/DIG. 38

FOREIGN PATENT DOCUMENTS

DE 601485 C 8/1934
DE 949275 C 9/1956
(Continued)

OTHER PUBLICATIONS

International Search Report and Written Opinion received for PCT/EP2019/076930 dated Oct. 31, 2019.
(Continued)

*Primary Examiner* — Nathan Cumar
(74) *Attorney, Agent, or Firm* — Greer, Burns & Crain, Ltd

(57) ABSTRACT

A handle assembly, including at least: a first handle including at least one recess and a square spindle configured to be received at least partially within the recess of the first handle, in an initial configuration, the first handle is configured to slide freely along the longitudinal axis of the square spindle over a given distance, the first handle is configured to pass from the initial position to a securing configuration in which the first handle is immobilized in translation and in at least one direction of rotation with respect to the square spindle, by at least one displacement in rotation of the first handle about the longitudinal axis of the square spindle through an angle strictly less than 360°.

15 Claims, 19 Drawing Sheets

(58) Field of Classification Search
USPC ........................................................ 292/336.3
See application file for complete search history.

(56) References Cited

FOREIGN PATENT DOCUMENTS

| | | | | |
|---|---|---|---|---|
| DE | 1912974 C3 | | 6/1975 | |
| EP | 0770745 A1 | | 5/1997 | |
| EP | 2480739 B1 | * | 4/2017 | ............. E05B 15/02 |
| WO | 9744556 A1 | | 11/1997 | |
| WO | 2011037510 A1 | | 3/2011 | |

OTHER PUBLICATIONS

French Search Report received for Application No. 1859489 dated Jul. 4, 2019.
Search Report received in Russian Application No. 2021111989, dated Mar. 23, 2023.

* cited by examiner

HANDLE ASSEMBLY FOR OPENING LEAVES OF THE WINDOW OR DOOR TYPE

BACKGROUND

The invention relates to the technical field of handles for opening leaves of a building or dwelling. More particularly, the invention relates to the rapid mounting of at least one handle on an opening leaf mechanism of the window, door, French door type.

Document DE 949 275 C describes a fastening for a square spindle.

As a general rule, opening leaves of the window, door or French door type are marketed and delivered separately from their handles for reasons of storage, and particularly of stacking of the opening leaves, but also to allow customization of the opening leaves by means of the style of the handles chosen.

Several known types of handles exist, and in particular: levers on a backplate which are in the form of a plate shaped to be placed flat against a portion of the door and a handle called a lever, generally in the shape of an L, or knobs extending in a plane substantially perpendicular to the plate; and levers on a rose which are in the form of a lever around which a disk, called a rose, is arranged.

Regardless of the type of handle, the latter are conventionally intended to be arranged on an opening leaf by means of a square spindle itself mounted in a follower intended to actuate the latch or the locking mechanism of the opening leaf when it is rotated. The square spindle is a rod, generally metal, making it possible to pivot the handle with respect to the opening leaf. The square spindle can either be pass-through in the case of a handle set i.e. the assembly of two opposite handles on either side of an opening leaf or blind in the case of an assembly of a handle on a single side of the opening leaf. Once the handle or handles are fitted on the square spindle, they must be fastened so that they do not come away from the opening leaf when they are used.

Several types of assembly of the handle on the opening leaf are known, either the lever is fastened to the square spindle by a pin or a screw; or the lever is integral with the plate or the rose and is secured to the opening leaf by screwing, in this case the square spindle remains free in the levers and only ensures the operation of driving in rotation and not holding firm under traction, or the assembly results from a combination of the first types mentioned above.

Generally, the handles are fastened by means of the rose or by means of the plate directly onto the opening leaf by a pin system and/or by screwing. These conventional fastening systems require tools, leaving marks on the opening leaf in the case of removal and the fastening operation is not quick or simple in itself. Moreover, to assemble handles on an opening leaf, it is necessary to take into account the thickness of the opening leaf, the position of the intended location for the assembly of the handle and of the locking mechanism of the opening leaf. All these assembly and fastening constraints prevent rapid and easily assembly of handles on any opening leaf.

Several inventions propose systems for fastening or assembling a handle on the opening leaf called quick or simplified systems, taking into account for example the variation in the thickness of the opening leaf.

For example, from document EP2480739 B1 filed by URFIC-Industria de Ferragens S. A. an assembly mechanism is known for a handle set comprising two handles intended to be mounted on either side of a door of a predetermined thickness. These two handles are connected to one another via a square spindle also connecting a locking mechanism of the door to said two handles. The handle set described is a rose handle set which can also be applied to plate handle sets. The square spindle has an adjustable connector produced in the form of a rack. The cover rose or plate is connected to an adjustment device for adapting the position of the rose or the plate to the thickness of the door. The adjustment device comprises a coupling with a magnet or a threading for fastening the adjustment device on the locking chamber, an outer part intended to be fastened on the rose or the plate and an inner part with the magnet, the outer and inner parts being connected to one another in an adaptable manner by an intermediary. In addition, to fasten the handle onto the square spindle, an insert with teeth complementary to the rack is inserted into the handle during the translation of the handle onto the square spindle, the teeth of the insert cooperating with the teeth of the rack and becoming slightly deformed to facilitate the advance of the handle on the rack. When the handle is positioned, the teeth return to their undeformed shape and anchor the position of the handle on the square spindle with no return possible.

From document DE1912974 C3, filed by Westfaelisches Metallwerk a mechanism is also known for assembling a handle set on a door configured to allow the assembly of the two handles on either side of the door, regardless of the thickness of the door, if the latter is comprised in the adjustment zone provided by the teeth of the adjustment device. The mechanism described has teeth arranged on the square spindle, which is fastened in a first handle and which cooperates with an insert having complementary teeth, said insert being positioned in the second handle. The assembly is carried out by translation of the second handle on the square spindle. The positioning of the second handle on the square spindle is carried out by the cooperation of the square spindle teeth/insert. Adjustment of the assembly with respect to the thickness of the door is carried out by the advance of the translation of the second handle on the square spindle until said second handle abuts against the door. To lock the second handle on the square spindle, a headless screw is inserted into the collar of the handle which cooperates with a groove arranged in the insert of said second handle.

None of these inventions takes into account the ergonomics or the gestures of the final, non-trade user. In fact, the latter may find it necessary to mount their customized handles themselves on several different opening leaves with the aim of unifying a room, the assembly and especially the disassembly of said handles is complex and does not leave any possible margin for error. In addition, there are few or no handle designs which are equally compatible with a window as with a door or a French door and offer an assembly that is quick, requires no tools and can be adapted to any thickness of opening leaf. Moreover, these devices have risks with respect to reliability and durability associated with locking by screwing or by the use of spring to hold the teeth in position in the rack.

SUMMARY

An aim of the invention is to resolve all or some of the abovementioned drawbacks and in particular to allow a quick and ergonomic assembly of a handle set or a single handle offering a range of adjustment making it possible to adjust for the thickness of the opening leaf.

To this end, a subject of the invention is a handle assembly intended to be secured on an opening leaf, comprising at least:

a first handle comprising at least one recess, a square spindle extending along a longitudinal axis and configured to be housed at least partially in the recess of the first handle, the first handle being configured to slide freely along the longitudinal axis of the square spindle over a given distance selected when the handle assembly is installed in an initial configuration, said handle assembly being characterized in that the first handle is configured to pass from the initial configuration to a securing configuration in which the first handle is immobilized in translation and in at least one direction of rotation with respect to the square spindle, by at least one displacement in rotation of the first handle about the longitudinal axis of the square spindle by an angle strictly less than 360°.

The advantage of such a handle assembly resides in the ease of assembly and securing of the first handle on the square spindle and on the opening leaf. In fact, the assembly is quick since a translation of the first handle on and around the opening leaf is sufficient for the assembly of the first handle. Securing is then carried out intuitively by actuating the handle in rotation in a direction of rotation of the handle, preferably in the direction of actuation of the handle.

According to a characteristic of the invention, the first handle is preferably configured so that in the securing configuration, the square spindle is driven in rotation with respect to the opening leaf.

According to a characteristic of the invention, the displacement in rotation of the first handle around the longitudinal axis of the square spindle can preferably be by an angle of substantially 45° or of 90° or 135°.

Advantageously, a rotation of 45° preferably corresponds to an assembly of a handle assembly comprising a single handle on a window without depth adjustment.

Advantageously, a rotation of 90° preferably corresponds to an assembly of a handle assembly comprising a first handle and a second handle with depth adjustment.

Advantageously, a rotation of 135°20 preferably corresponds to an assembly of a single handle assembly on a window with a pawl catch device.

According to a characteristic of the invention, the relief of the square spindle preferably extends over a given distance, each point of the distance preferably corresponding to an insertion depth of the handle. Thus, the cooperation of the square spindle and the recess of the first handle at a point allows immobilization in translation at the chosen depth, which allows the easy use of such a handle assembly regardless of the thickness of the opening leaf. Advantageously, the handle assembly according to the invention preferably makes it possible to take up a variation in the thickness of the opening leaf of the order of substantially 10 mm.

According to a characteristic of the invention, the recess is preferably a through or blind recess.

According to a characteristic of the invention, the recess is preferably arranged in an end portion of the first handle.

According to a characteristic of the invention, the recess preferably comprises an inner wall delimiting an inner volume shaped to receive at least a portion of the square spindle.

According to a characteristic of the invention, the recess is preferably globally cylindrical in shape.

According to a characteristic of the invention, the recess preferably comprises at least one locking member configured to cooperate with a complementary locking member in securing configuration, the locking member preferably being directly or indirectly arranged in the recess.

According to a characteristic of the invention, the recess preferably comprises at least one complementary relief arranged in its inner volume, preferably configured to cooperate with a relief of the square spindle.

According to a characteristic of the invention, the complementary relief of the recess preferably comprises a rack or a succession of projecting spurs extending longitudinally over at least a portion of the inner volume of the recess.

According to a characteristic of the invention, the locking member can preferably have the form of a spur or a notch or a succession of ribs or grooves.

According to a characteristic of the invention, the locking member is preferably arranged in the inner volume of the recess.

According to a characteristic of the invention, the locking member is preferably a notch configured to cooperate with a complementary locking member in the form of a spur arranged directly or indirectly on the square spindle.

Alternatively, the locking member is preferably a spur configured to cooperate with a complementary locking member in the form of a notch arranged directly or indirectly on the square spindle.

According to a characteristic of the invention, the cooperation between the locking member and the complementary locking member is preferably a cooperation of the bayonet type.

According to a characteristic of the invention, the locking member and the complementary relief can be merged in one and the same member for immobilizing in rotation and in translation.

According to a characteristic of the invention, the recess preferably comprises an insert integrated in the inner volume of said recess.

According to a characteristic of the invention, the insert preferably has a shape which fits closely with the shape of the recess of the first handle and preferably more particularly the shape of the inner wall of the recess delimiting the inner volume of the recess.

According to a characteristic of the invention, the insert is preferably captive and immobilized in the inner volume of the recess. For example, the insert can be embedded, riveted, inserted by force, etc.

According to a characteristic of the invention, the insert is preferably globally cylindrical in shape.

According to a characteristic of the invention, the insert preferably comprises a through hollow delimited by an inner wall.

According to a characteristic of the invention, the insert preferably comprises an outer wall intended to be in contact with the inner wall of the recess.

Advantageously, the insert preferably comprises at least one angular guide element configured to cooperate with a complementary guide element arranged in the inner wall of the recess.

According to a characteristic of the invention, the guide element can be a pin or a hollow or a rib or a groove, and the complementary guide element can be respectively a hollow or a pin or a groove or a rib.

According to a characteristic of the invention, the locking member of the recess can be positioned on the insert preferentially on the inner wall of the insert.

According to a characteristic of the invention, the complementary relief of the recess can be arranged on the insert.

According to a characteristic of the invention, the thickness of the inner wall of the insert preferably has a radial variation forming a cylindrical ramp.

In other words, the inner wall of the insert preferably forms a radially progressive ramp. This geometry makes it possible to pass a movable part of an adaptor from a retracted position in which the complementary relief and the relief of the square spindle are not in contact, to an engaged position in which the complementary relief and the relief of the square spindle mate together and engage with one another.

Of course, the ramp can be directly arranged in the recess. For example, if the ramp increases in an anticlockwise direction, the inner wall becomes thicker in this anticlockwise direction of rotation.

According to a characteristic of the invention, the ramp preferably comprises at least one stop on one end of said ramp in order to mark a first end position corresponding to the retracted position of the movable part.

According to a characteristic of the invention, the ramp can be symmetrical and have a first end and a second end convergent towards a central portion; from the first end towards the central portion the ramp descends and from the central portion to the second end the ramp ascends. This configuration allows a movement in rotation of the first handle and thus of the insert, either in the clockwise direction, or in the anticlockwise direction.

According to a characteristic of the invention, the recess preferably comprises an adapter shaped to be housed in the insert or directly in the recess, said adapter preferably comprises an inner cavity adapted to the shape of the square spindle.

According to a characteristic of the invention, the adapter preferably serves as an intermediary between the insert and the square spindle. And more particularly, the adapter preferably bares the complementary relief intended to cooperate with the relief of the square spindle.

According to a characteristic of the invention, the adapter preferably comprises a main body in which the inner cavity is arranged. Preferentially, the inner cavity is a through cavity.

According to a characteristic of the invention, the adapter is preferably free in rotation in the recess of the first handle.

According to a characteristic of the invention, the complementary locking member intended to cooperate complementarily with the locking member of the recess positioned on the insert or on the recess, is preferably arranged on the adapter.

According to a characteristic of the invention, the complementary locking member can be at least a projecting spur, a hollow or notch, a rib, a groove or a surface state equipped with relief(s), etc. as a function of the shape of the locking member.

According to a characteristic of the invention, the adapter preferably comprises an elastically deformable portion configured so as, in a first state, to be compressed by a portion of the insert pressing on said elastically deformable portion of the adapter, and in a second state, to be released so that it cooperates with a retaining hollow arranged in the insert.

According to a characteristic of the invention, the complementary relief of the recess can be arranged on the adapter directly or indirectly.

According to a characteristic of the invention, the adapter preferably comprises a movable part mounted in a removable manner on the main body of the adapter.

According to a characteristic of the invention, the movable part can be formed in a single piece with the main body of the adapter or separately.

When the movable part is formed in a single piece with the main body, the latter is preferably connected with at least one elastically deformable connection to the main body.

According to a characteristic of the invention, the movable part is preferably configured to be mobile between a retracted position and an engaged position with respect to the main body.

Preferentially, the complementary relief of the recess is preferably positioned on the movable part.

According to a characteristic of the invention, the main body of the adapter preferably comprises an opening though which the complementary relief is intended to project in the engaged position of the movable part.

According to a characteristic of the invention, the movable part preferably comprises a bearing surface opposite the complementary relief, the bearing surface being shaped to cooperate with the insert ramp, so that when the handle is in the securing configuration, the movable part is displaced in the main body into the engaged position, the displacement of the movable part being induced by the rotation of the handle and more particularly of the insert about the longitudinal axis of the square spindle, the ramp arranged in the insert forcing the displacement of the movable part by exerting a pressure on said movable part.

According to a characteristic of the invention, the square spindle preferably comprises at least one relief arranged directly or indirectly on the square spindle.

According to a characteristic of the invention, the square spindle preferably comprises at least a part having a square transverse section. The part having a square transverse section preferably being the part intended to pass through the follower of the opening leaf or to cooperate with a latch mechanism of the opening leaf.

According to a characteristic of the invention, the section of the square spindle can be of a shape other than square, for example, triangular, rectangular or polygonal or any other shape adapted to the opening leaf mechanism.

According to a characteristic of the invention, the square spindle preferably comprises a first end intended to cooperate with the first handle.

According to a characteristic of the invention, the square spindle preferably comprises a second end opposite the first end, the second end being intended to cooperate with a second handle or with an opening leaf follower.

According to a characteristic of the invention, the square spindle preferably comprises at least one relief arranged on at least a part of its length, and configured to cooperate with the relief equipping the recess or the insert or the adapter.

According to a characteristic of the invention, the relief of the square spindle can comprise a rack or a succession of grooves or depressions with respect to the surface of the square spindle, extending longitudinally along the longitudinal axis of the square spindle. Advantageously, the relief of the square spindle has the form of a rack or a succession of projecting spurs, making it possible to adjust the depth of the first handle on the square spindle and to immobilize it in translation on the longitudinal axis of the square spindle.

According to a characteristic of the invention, the square spindle preferably comprises a complementary locking member which can have the form of a spur or a notch, which participates in that which allows locking in rotation of the first handle on the square spindle. The relief of the square spindle can incorporate the complementary locking member.

According to a characteristic of the invention, the complementary locking member can be arranged directly or indirectly on the square spindle.

According to a characteristic of the invention, the complementary locking member can be arranged directly or indirectly on the adapter.

According to a characteristic of the invention, the complementary locking member is preferably a notch configured to cooperate with a locking member of the recess.

Alternatively, the complementary locking member is preferably a spur configured to cooperate with a locking member of the recess, for example a notch.

According to a characteristic of the invention, the handle assembly preferably comprises in addition a catch device configured to allow the first handle to catch to an opening leaf mechanism or a second handle of the handle assembly.

According to a characteristic of the invention, the catch device preferably comprises a pawl, a drive rod of the pawl and a drive pin of the drive rod.

According to a characteristic of the invention, the square spindle preferably comprises a through orifice extending longitudinally through the square spindle and shaped to at least partially house a drive rod.

According to a characteristic of the invention, the drive pin is preferably mounted on a first end of the drive rod and is shaped to be housed in the recess of the first handle.

According to a characteristic of the invention, the pawl is preferably mounted on a second end of the drive rod opposite the drive pin.

According to a characteristic of the invention, the pawl is preferably configured to be mobile between at least two positions:

- a passing position in which the pawl is aligned with the square spindle,
- a catching position in which the pawl is not aligned with the square spindle and has a projecting shape with respect to said square spindle.

Advantageously, in the passing position, the pawl is preferably in the extension of the square spindle, which allows to pass the opening leaf mechanism and more precisely the follower, the square spindle preferably being dimensioned to cooperate by complementarity of shape with the follower of the mechanism. While in the catching position, the pawl is preferably projecting with respect to the profile of the square spindle, which prevents the pawl from passing into the opening leaf mechanism and specifically through the follower.

According to a characteristic of the invention, the square spindle preferably comprises faces which in the passing position are coplanar with faces of the pawl and which in the catching position are secant to the faces of the pawl.

According to a characteristic of the invention, the pawl preferably passes from the passing position to the catching position by a rotation, by a given angle, preferentially by an angle of 45°, of the first handle.

According to a characteristic of the invention, the catch device preferably comprises an elastically deformable compressible member, for example a spring or an elastically deformable membrane, the compressible member being positioned around a part of the drive rod.

According to a characteristic of the invention, the pawl and the drive pin are preferably crimped on the drive pin. Preferentially the drive pin is housed in the first handle.

According to a characteristic of the invention, in an intermediate configuration of the first handle, between the initial configuration and the securing configuration, the pawl is preferably in the passing position, the recess portion of the first handle is placed flat against the base plate and the elastically deformable compressible member is compressed inside the recess portion of the first handle. According to a characteristic of the invention, in the securing configuration, the elastically deformable compressible member is released, the complementary locking member is housed in the locking member.

The base plates or roses used in the assembly of the handles on the opening leaves are preferably generally secured using screws. In the case of window handles, the base plate is preferably secured to the opening leaf by screwing two screws into the espagnolette mechanism.

Advantageously, the technical solution developed according to the invention preferably uses the aperture in the opening leaf aperture made in the doors or windows in order to allow passing of the square spindle through the follower of the latch. This aperture is preferably generally of a standardized diameter of 22 mm for doors.

According to the invention, it is possible to ensure securing of a base plate with the opening leaf by using the movement in rotation of the handle and the force which can be associated with it.

In the present invention, by “front portion” of an element, is preferably meant a portion which, in the assembly direction, is proximal to the first handle of the handle assembly.

In the present invention, by “back portion” of an element, is preferably meant a portion opposite to the front and distal part, in the assembly direction, and to the first handle of the handle assembly.

According to a characteristic of the invention, the handle assembly preferably comprises a device for additional securing of a base plate in the opening leaf, said device preferably comprising at least one base plate configured to be at least partially housed in an opening leaf aperture and at least one locking element configured to immobilize in translation and in rotation, directly or indirectly, the base plate in the opening leaf aperture, by rotation of the first handle in at least one direction of rotation.

This additional securing device is very advantageous because it is compact, makes it possible to ensure the reinforcement of the opening leaf aperture in a configuration and to ensure securing.

According to a characteristic of the invention, the base plate preferably comprises at least one receiving orifice intended to be positioned facing the mechanism of the opening and configured to receive a portion of the first handle.

According to a characteristic of the invention, the base plate can be an outer cover extending over the opening leaf, around the opening leaf aperture.

According to a characteristic of the invention, the base plate can comprise at least two parts, a first portion, for example U-shaped, intended to be slid from one side of the square spindle and a second portion, intended to slide from the other side of the square spindle so as to fit tightly with the first portion of the square spindle, the second portion cooperating in a fixed manner with the first portion.

In a variant, the base plate is preferably a part fitted on the end of the handle and more particularly at the level of the catch portion of the handle.

Preferentially, the base plate can be fixed to the opening leaf without screws and without assembly tools, either simply by the catch effect of the pawl, or by the combined effect of the pawl and of the locking element of the additional securing device.

According to a characteristic of the invention, the base plate is preferably an inner base plate comprising a first portion having a recess shaped to house the locking element.

Preferentially, the first portion is preferably oblong in shape and contains a lock that is oblong in shape and mobile in rotation about the axis of the square spindle so that during the rotation of the first handle, the lock is possibly driven in rotation until reaching an angle where it is partially protruding from the first portion of the base plate.

According to a characteristic of the invention, the first portion of the base plate is preferably intended to pass through the opening leaf and project on a side of the opening leaf opposite the side of the opening leaf where the first handle is positioned.

According to a characteristic of the invention, the base plate preferably comprises a second portion in which the receiving orifice of the first handle is arranged.

According to a characteristic of the invention, the base plate of the additional securing device can be an expansive base plate configured to extend in the opening leaf aperture.

According to a characteristic of the invention, the expansive base plate preferably is in the shape of a disk comprising a front portion turned towards the first handle and a back portion turned towards the second handle and/or the opening leaf.

According to a characteristic of the invention, the back portion of the base plate preferably comprises a plurality of elastically deformable blades arranged around a central orifice.

Preferentially, the expansive base plate preferably comprises three blades arranged regularly around the central orifice.

According to a characteristic of the invention, the blades preferably each have a folded end forming a hook or a point configured to penetrate into the material of the door.

According to the invention, the locking element is preferably configured to indirectly immobilize the base plate in translation and in rotation in the opening leaf aperture, when the locking element is an expansion cam configured to cooperate with the expansive base plate and preferably comprising at least one member configured to force the expansion at least of a part of the expansive base plate into the opening leaf aperture, by rotation of the first handle.

According to the invention, the locking element is preferably configured to directly immobilize the base plate in translation and in rotation in the opening leaf aperture, when the locking element is a lock equipped with a contact surface, the contact surface acting directly on the lock which directly immobilizes the base plate.

According to a characteristic of the invention, the locking element is preferably a lock equipped with a contact surface, in the case of an inner base plate.

According to a characteristic of the invention, preferably, the shape of the lock is preferentially oblong, comprising two diametrically opposite vanes, a clip which is in the form of an elastically deformable bracket and arranged on one side of the lock between the vanes.

According to a characteristic of the invention, the lock preferably comprises an inner lug intended to cooperate with a portion of the contact surface.

In addition, according to a characteristic of the invention, the contact surface is preferably shaped to be positioned in the lock and comprise a projecting stop spur configured to cooperate in particular with the clip in order to anchor the securing of the base plate in the opening leaf.

Advantageously, the contact surface is preferably firmly fixed to the square spindle.

According to a characteristic of the invention, the expansion cam is preferably shaped to be mobile in rotation between at least one position in which the cam does not exert a force on the expansive base plate and a position in which the expansion cam exerts a force on the expansive base plate by the rotation of the first handle.

Advantageously, when the square spindle is rotated by actuating the first handle, the square spindle can preferably drive the expansion cam in rotation, over all or part of its stroke.

According to a characteristic of the invention, the expansion cam preferably comprises a front portion on which a drive spur is positioned, the drive spur being intended to cooperate with the insert of the first handle.

According to a characteristic of the invention, the expansion cam preferably is in the shape of a ring or a cylinder.

According to a characteristic of the invention, the expansion cam preferably comprises a back portion on which a plurality of projections is arranged.

Preferentially, the back portion of the cam preferably comprises three projections.

According to a characteristic of the invention, the projections preferably have the shape of progressive ramps in one and the same direction of rotation about a longitudinal median axis A-A of the expansion cam.

According to a characteristic of the invention, the projections are preferably provided at one end with a stop, preferably rounded, which is shaped to cooperate with the blades.

According to a characteristic of the invention, the base plate preferably comprises an external lock mobile in translation and configured to immobilize the first handle.

According to a characteristic of the invention, the external lock preferably cooperates with the first handle and preferably the external lock abuts against the insert or on the adapter or the recess of the handle in order to avoid bringing the first handle towards the opening leaf and to prevent disengagement of the complementary locking member in the locking member.

A subject of the invention is also a system for returning the handle, preferably integrated with a handle assembly according to the invention but which can be applicable to any other handle assembly without a pre-existing return system.

In various situations, it is useful to integrate a spring return system in the handle assembly. This return system makes it possible for the handle to return to the resting position, i.e. oriented horizontally. In addition, this return system makes it possible to assist the spring integrated in the latch mechanism which is sometimes undersized and for this reason does not provide a satisfactory return of the handle.

In the existing return systems, the spring acts between the handle and the opening leaf. It is commonly mounted inside the rose or the plate for securing the handle on the opening leaf, for example a door. It is thus necessary for said roses or plates to be firmly fastened to the door to create the fixed bearing point of the spring, making it possible to counteract the rotation force when the handle is in use. This fastening is carried out by means of screws, either through screws, securing the first rose or plate by direct screwing into the second, opposite rose or plate through the thickness of the door, or by screwing roses or plates on either side of the door into the material of the door itself, generally wood screws.

Nevertheless, this assembly operation has drawbacks. In fact, this operation requires holes to be drilled for through screws, the positioning and the screwing of the wood screws, which is difficult because they are not very accessible, in particular on the rose assembly, due to the proximity of the handle. In addition, this operation poses a risk of operating error and damage to the door (screwdriver or power driver impact) and requires the use of tools (screwdriver, power driver).

An aim of the return system according to the invention is to overcome all or part of the abovementioned drawbacks and in particular to allow the quick assembly of a handle assembly integrating a return spring on a standard door, without tools (screwdriver, drill, etc.) and with minimum equipment.

To this end, a subject of the invention is a handle assembly comprising a handle assembly intended to be secured on an opening leaf, comprising at least:

- a first handle comprising at least one recess,
- a square spindle extending along a longitudinal axis and configured to be housed at least partially in the recess of the first handle, characterized in that the handle assembly comprises in addition a return system of the first handle comprising a return spring configured so as, in one configuration, to force the return of the first handle to the initial position, the return spring comprising a first end arranged on a first member with respect to which the first handle is mobile in rotation and a second end arranged on a second member with respect to which the first handle is fixed in rotation.

Advantageously, when the first handle is in the initial or resting position, the return spring preferably exerts a first force greater than or equal to 0, and when the first handle is rotated, the spring preferably has a second force greater than the first pressure.

According to a characteristic of the invention, the return system can integrate an additional securing device according to the invention so that the first member with respect to which the first handle is mobile in rotation is an expansive base plate.

According to a characteristic of the invention, the second member with respect to which the first handle is fixed in rotation is preferably an insert of the first handle or the first handle itself.

Advantageously, during the rotation of the first handle, a drive spur arranged on the expansion cam preferably abuts against a portion of the insert, which immobilizes the return system in rotation and which prestresses the spring of the return system.

It is thus possible to produce, in one and the same action, the securing of the rose comprising the spring with the door and the handle with the square spindle.

According to a characteristic of the invention, the spring of the return system is preferably in the form of a spiral with at least one coil.

BRIEF DESCRIPTION OF THE DRAWINGS

The invention will be better understood, by virtue of the description below, which relates to embodiments according to the present invention, given by way of non-limitative examples and explained with reference to the attached diagrammatic figures. The attached diagrammatic figures are listed below.

As these embodiments are in no way limitative, variants of the invention can in particular be considered comprising only a selection of the characteristics described or illustrated hereinafter, in isolation from the other characteristics described or illustrated (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

DETAILED DESCRIPTION

Regardless of the embodiment of the handle assembly according to the invention, the handle assembly 100 is intended to be secured on an opening leaf 200 and comprises at least a first handle 110 which can be a lever or a button or have any other shape.

Figure 1:
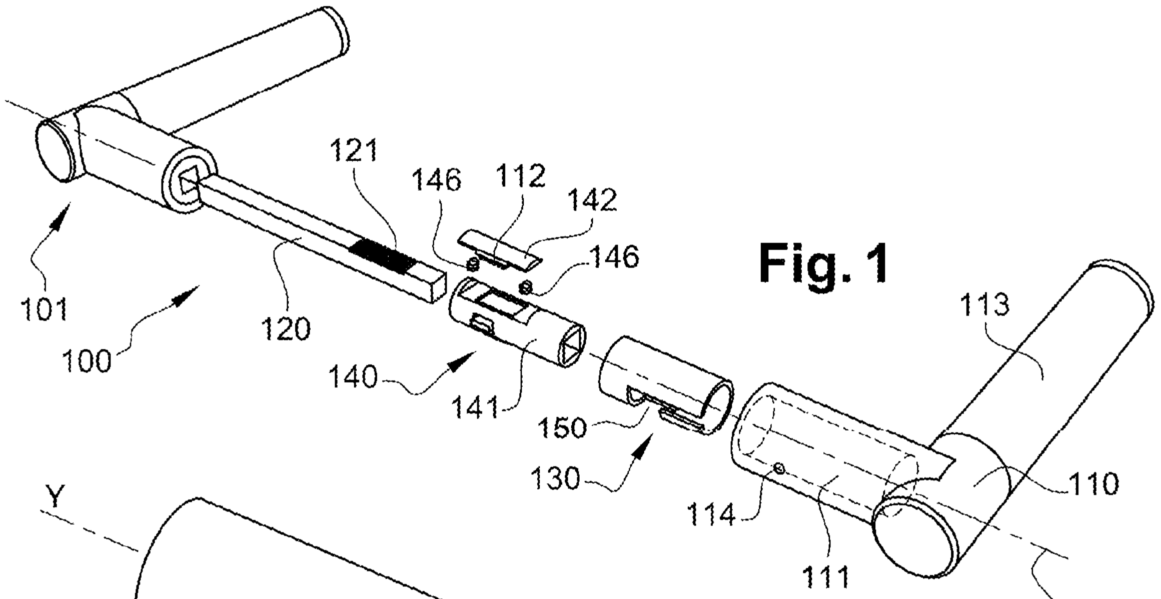
FIG. 1 is an exploded view of a handle assembly according to the invention according to a first embodiment.
Figure 99:
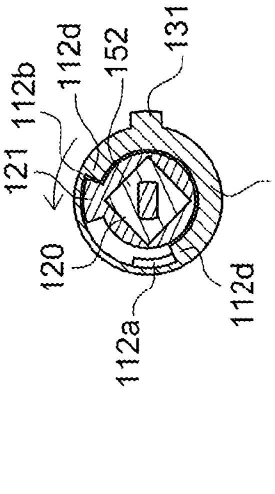

In the examples illustrated in FIGS. 1 to 99, the first handle 110 of the handle assembly 100 is a lever comprising a grip portion and a recess portion 114.

Regardless of the embodiment of the handle assembly according to the invention, the first handle 110 has a recess 111.

In the embodiments illustrated in FIGS. 1 to 99, the recess 111 of the first handle 110 is blind but, of course, it can be a through hole.

Regardless of the embodiment of the handle assembly according to the invention, the recess 111 is arranged in an end portion of the first handle 110.

In addition and regardless of the embodiment, the recess 111 comprises an inner wall delimiting an inner volume shaped to receive at least a portion of the square spindle 120.

Regardless of the embodiment of the handle assembly 100 according to the invention, the handle assembly 100 moreover comprises a square spindle 120 extending along a longitudinal axis X-X and configured to be housed at least partially in the recess 111 of the first handle 110.

Regardless of the embodiment of the handle assembly 100 according to the invention, the square spindle 120 comprises at least one relief 121 arranged directly or indirectly on the square spindle 120.

Regardless of the embodiment of the handle assembly 100 according to the invention, the square spindle 120 comprises at least a part having a square transverse section. The part having a transverse section being the part intended to pass through the follower 202 of the opening leaf 200 or to cooperate with a latch mechanism 201 of the opening leaf 200.

Regardless of the embodiment of the handle assembly 100 according to the invention, the square spindle 120 comprises a first end intended to cooperate with the first handle 110.

Regardless of the embodiment of the handle assembly 100 according to the invention, the square spindle 120 comprises a second end opposite the first end, the second end being intended to cooperate with a second handle 101 or with a follower 202 of the opening leaf 200. In both cases, it also cooperates with a follower 202 to actuate a latch or an espagnolette, called locking mechanism 201 of the opening leaf 200.

Regardless of the embodiment of the handle assembly 100 according to the invention, the handle assembly 100 can comprise an additional securing device configured to reinforce the opening leaf aperture 203 and to allow securing of a base plate 156, 171 in the opening leaf 200. The securing device comprises a base plate 156, 171.

The first embodiment will now be described with reference to FIGS. 1 to 20.

According to the first embodiment, the handle assembly 100 can comprise a first single handle 110, in this case the handle assembly 100 is mounted blind on an opening leaf 200, or with a first handle 110 and a second handle 101 opposing the first handle 110, the first handle 110 and the second handle 101 being positioned on either side of the opening leaf 200.

FIGS. 1 to 20 illustrate the case in which the handle assembly 100 comprises a first handle 110 and a second handle 101.

FIG. 1 illustrates the different components of the handle assembly 100 according to the first embodiment. The handle assembly 100 comprises a square spindle 120, which in the case of a handle assembly 100 without a second handle 101 can already be fixed on the opening leaf. Moreover, the handle assembly 100 comprises an insert 130 and an adapter 140 comprising a main body 141 and a clamp 142. In the variant of the first embodiment illustrated in FIG. 6, the handle assembly 100 comprises the same components as the handle assembly 100 according to the first embodiment, and in addition comprises two roses 102 and two rose covers 103.

According to the first embodiment, the square spindle 120 has a relief 121 arranged directly on at least a part of its length, and configured to cooperate with a complementary relief 112. In the example illustrated in FIG. 1 according to the first embodiment, the relief 121 of the square spindle 120 is in the form of a rack extending longitudinally along the longitudinal axis X-X of the square spindle 120. The ridges of the relief each correspond to a given distance at which the first handle can be immobilized in translation, in its securing configuration. Depending on the thickness of the opening leaf 200 and on the locking mechanism of the opening leaf 200, the first handle 110 cooperates with the square spindle 120 over a given distance.

Figure 2:
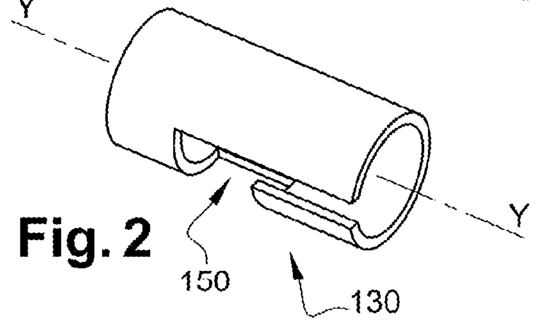
FIG. 2 is a perspective view of the insert of the handle assembly illustrated in FIG. 1.

According to the first embodiment, the insert 130, illustrated in FIG. 2, is intended to be integrated in the inner volume of the recess 111 of the first handle 110, as will be seen in the remainder of the description. In the first embodiment, the insert 130 comprises at least one guide element 131 configured to cooperate with a complementary guide element 111*b* arranged in the inner wall of the recess 111 as illustrated in particular in the figures in cross section of the handle assembly according to the first embodiment. In this example, the guide element 131 is a pin and the complementary guide element 111*b* is a hollow shaped to receive said pin. Of course, the guide element 131 can take other forms such as a hollow or a rib or a groove and the complementary guide element 111*b* can complementarily have the shape of a pin or a groove, or a rib. Advantageously, the insert 130 is captive and immobilized in the inner volume of the recess 111. For example, the insert 130 can be embedded, riveted, inserted by force, etc. Moreover, it should be noted that the guide element 131 and the complementary guide element 111*b* are optional and may not be present.

In the first embodiment, the locking member 150 is arranged on the insert 130, on the inner wall of the insert 130. The locking member 150 is a notch intended to cooperate with a complementary locking member 151 of the spur type. The locking member 150 extends over a part of the circumference of the insert and forms with the complementary locking member 151 a bayonet fitting system. In addition, the inner wall of the insert 130 at least partially forms a progressive ramp 132 about an axis of revolution merged with the longitudinal axis Y-Y along which the insert 130 extends.

Figure 3:
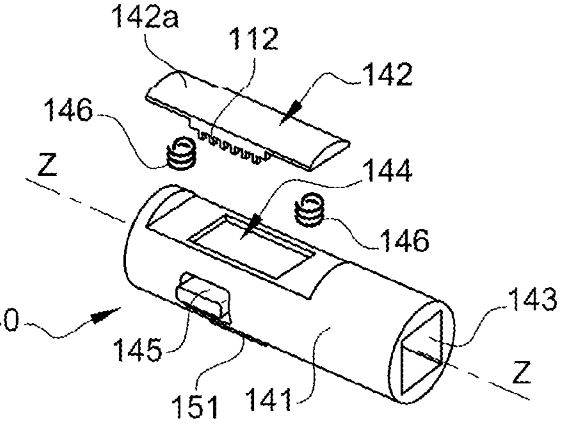
FIG. 3 is an exploded view of the adapter of the handle assembly illustrated in FIG. 1.

The adapter 140 illustrated in FIG. 3 comprises a main body 141 preferentially in the shape of a ring. The main body 141 comprises an inner cavity 143 adapted to the shape of the square spindle 120. The inner cavity 143 is preferentially a though cavity along a longitudinal axis Z-Z of the adapter 140. The complementary locking member 151 is positioned on the outer wall of the adapter and is in the shape of a projecting spur.

In the first embodiment, the complementary relief 112 of the recess 111 is arranged on the adapter 140. More particularly, the adapter 140 comprises a movable part 142 mounted in a removable manner on the main body 141 of the adapter 140, the complementary relief 112 being arranged on the movable part 142. The movable part 142 is configured to be mobile between a retracted position and an engaged position with respect to the main body 141. In the engaged position, the movable part 142 is under compression on the main body 141, the movable part 142 being connected to the main body 141 by at least one elastically deformable member 146, for example a spring.

The main body 141 of the adapter 140 comprises an opening 144 through which the complementary relief 112 is intended to project in an engaged position of the movable part 142. In addition, the movable part 142 comprises a bearing surface 142*a* opposite the complementary relief 112, the bearing surface 142*a* being shaped to cooperate with the ramp 132 of the insert 130.

Figure 4:
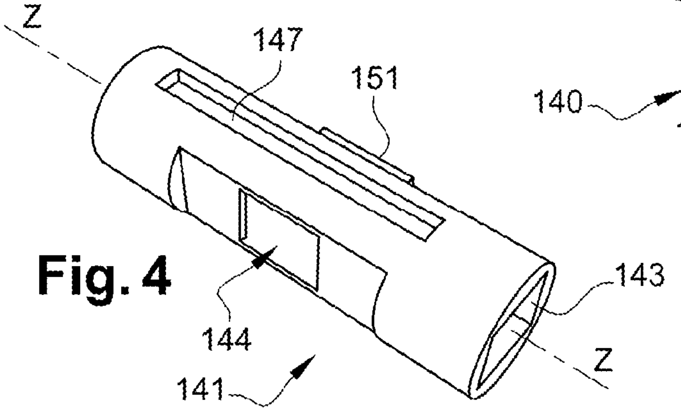
FIG. 4 is an exploded view of a variant of the adapter of the handle assembly illustrated in FIG. 1.
Figure 5:
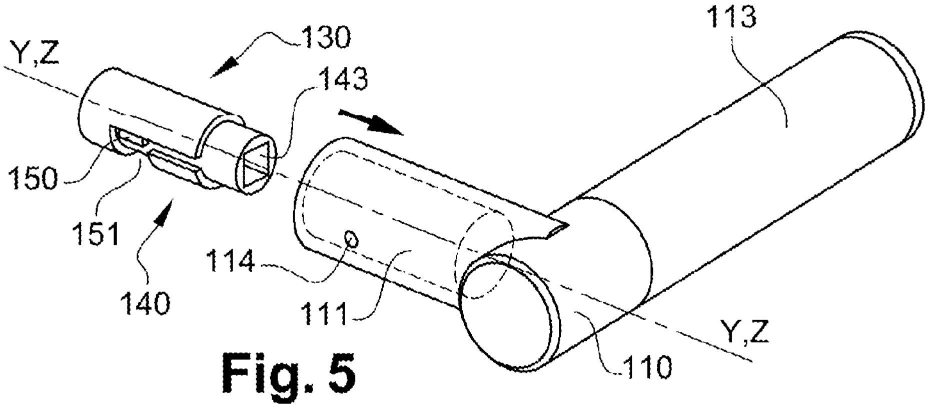
FIG. 5 is an exploded perspective view of the pre-assembly of the insert with the adapter on the first handle of the handle assembly according to FIG. 1.
Figure 20:
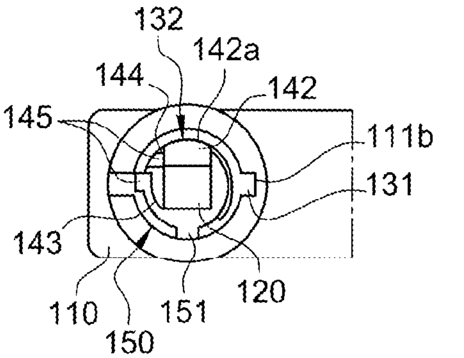

According to the first embodiment, the adapter 140 comprises an elastically deformable portion 145 configured so as, in a first state, to be compressed by a portion of the insert as can be seen in FIGS. 14, 16, 18, 20, pressing on said elastically deformable portion 145 of the adapter 140, and in a second state, to be released in the insert 130 as can be seen in FIG. 20. In the first embodiment, the elastically deformable portion 145 comprises a spur. In a variant, the elastically deformable portion 145 can be a spring blade integrated in a groove 147 arranged in the adapter 140 as illustrated in FIG. 4.

Figure 9:
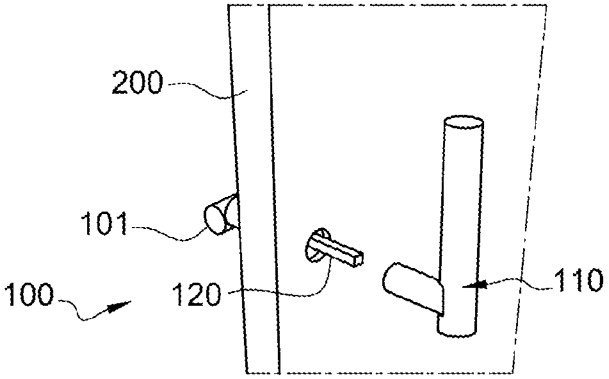

In the first embodiment, the second handle 101 is mounted on the square spindle 120 on a side of the opening leaf 200 as illustrated in FIG. 9. This assembly can be permanent (crimping, pin, etc.) or removable (screwing, removable clip, etc.).

Figure 13:
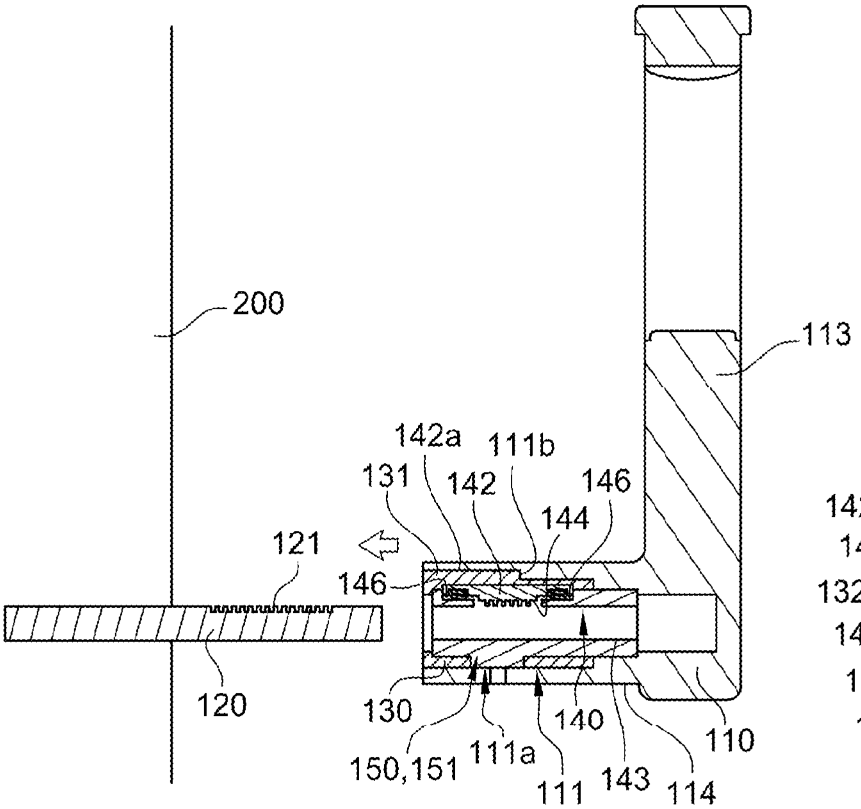
FIGS. 13 to 20 illustrate in detail the mechanism of the handle assembly following the steps of the assembly method illustrated in FIGS. 9 to 12, FIGS. 21 to 28 illustrate the assembly steps of a handle assembly according to the first embodiment and equipped with a handle return system.
Figure 14:
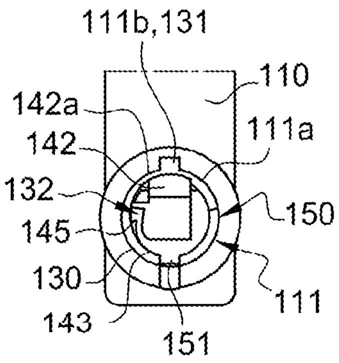

As shown in FIGS. 9, 13 and 14, on the other side of the opening leaf, the first handle 110 is pre-mounted by inserting into the recess 111, the insert 130 and adapter 140 assembly. Of course, it is possible that the insert 130 is already mounted in the recess 111. In this pre-mounted configuration, the movable part 142 of the adapter 140 is in retracted position with respect to the main body 141 of the adapter 140, as can be seen in FIGS. 9 and 13, 14. In addition, in this configuration, the first handle 110 has a first orientation in which the grip portion 113 of the first handle 110 is vertical. The movable part 142 is positioned on an affine position of the ramp 132 as can be seen in FIG. 13 and in FIG. 14.

Figure 10:
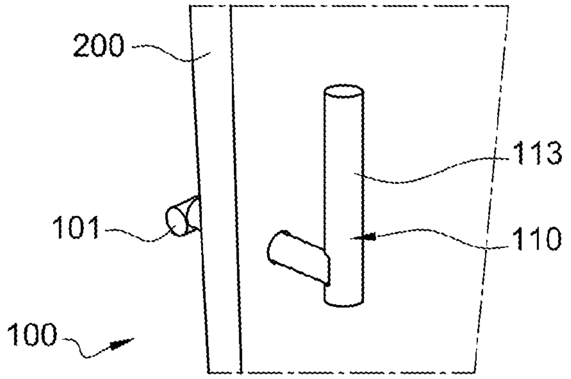
Figure 15:
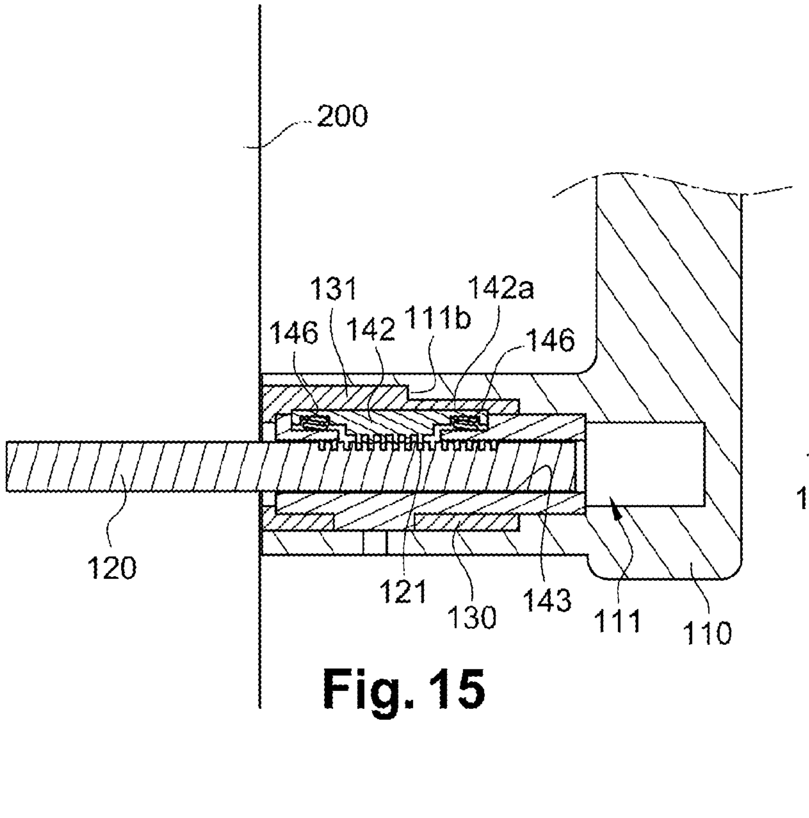
Figure 16:
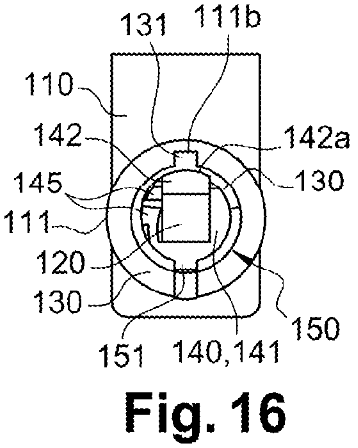

In FIGS. 10, 15 and 16, the initial configuration of the first handle 110 is shown in which the first handle 110 can slide freely along the longitudinal axis X-X of the square spindle 120 over a distance determined by the relief 121 of the square spindle 120 and the complementary relief 112 arranged on the movable part 142. In this embodiment, the first handle 110 is mounted on the square spindle 120 until it abuts the opening 200, as can be seen in FIGS. 10 and 15.

When the square spindle 120 enters the inner cavity 143 of the adapter 140, the relief 121 and the complementary relief 112 are positioned facing one another without interlocking.

Figure 11:
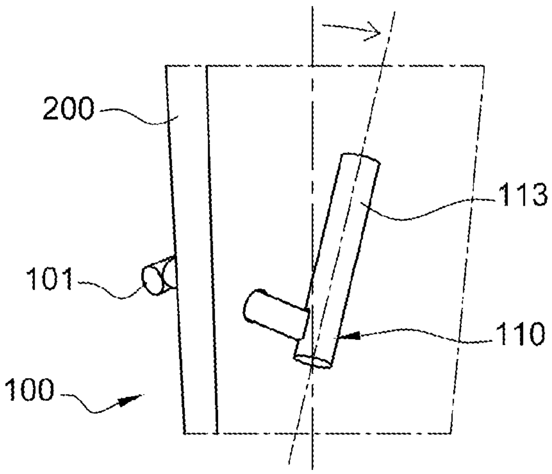
Figure 17:
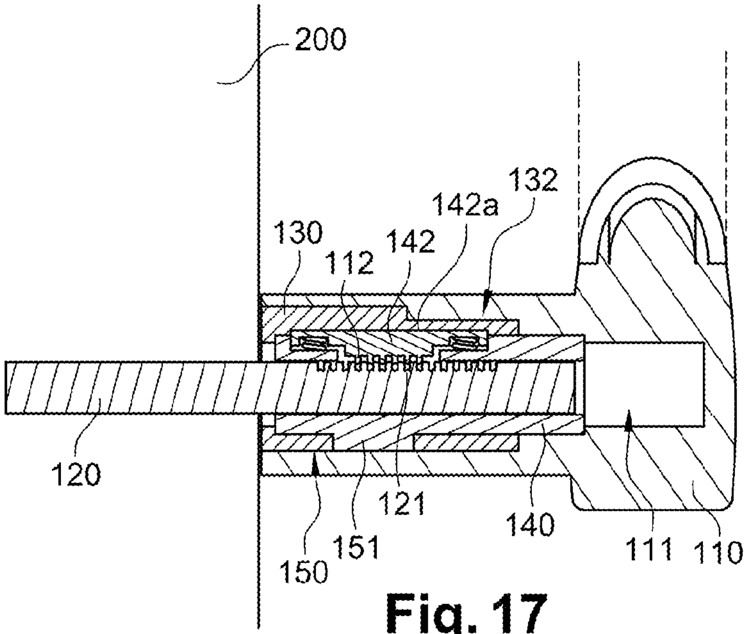
Figure 18:
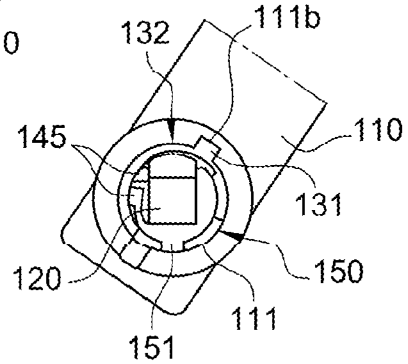

In FIGS. 11, 17 and 18, the first handle 110 is rotated in a direction of rotation, in this case in the clockwise direction. The movable part 142 moves on the ramp 132 and because of the shape of the ramp 132, the movable part 142 tends towards the engagement position and is compressed little by little towards the main body 141 of the adapter 140 so that the relief 121 of the square spindle 120 and the complementary relief 112 of the movable part 142 mate, this pairing making it possible to immobilize the first handle 110 in translation with respect to the square spindle 120.

Figure 12:
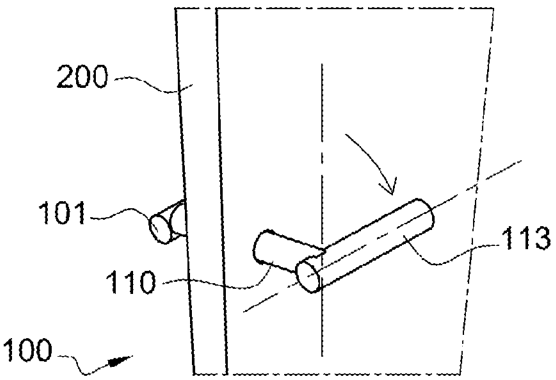
Figure 19:
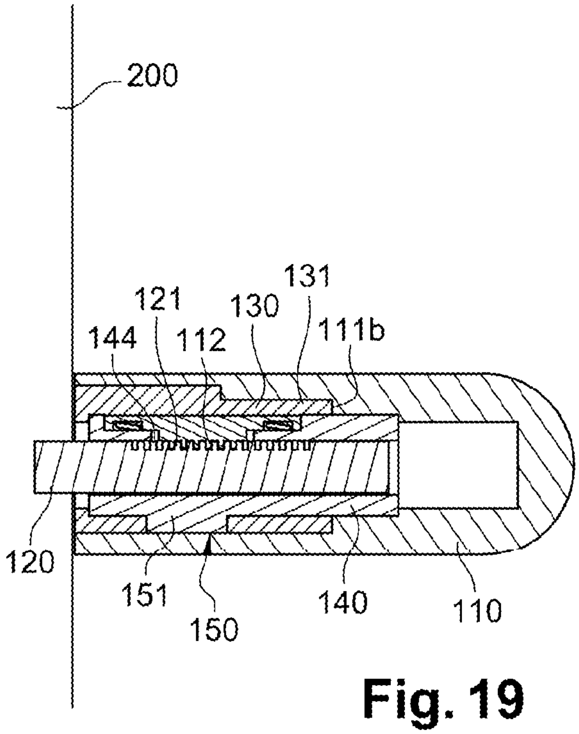

In FIGS. 12, 19 and 20, the first handle is in the securing configuration: the first handle 110 is immobilized in translation with respect to the square spindle 120 and is immobilized in rotation with respect to the square spindle 120. In this configuration, the relief 121 of the square spindle 120 mates with the complementary relief 112, the movable part 142 being in an engagement position and compressed against the main body 141 so that the complementary relief 112 projects with respect to the opening 144 arranged in the main body of the adapter 140. In addition, in this configuration, the locking member 150 cooperates with the complementary locking member 151 in order to immobilize the first handle in rotation with respect to the square spindle.

Figure 6:
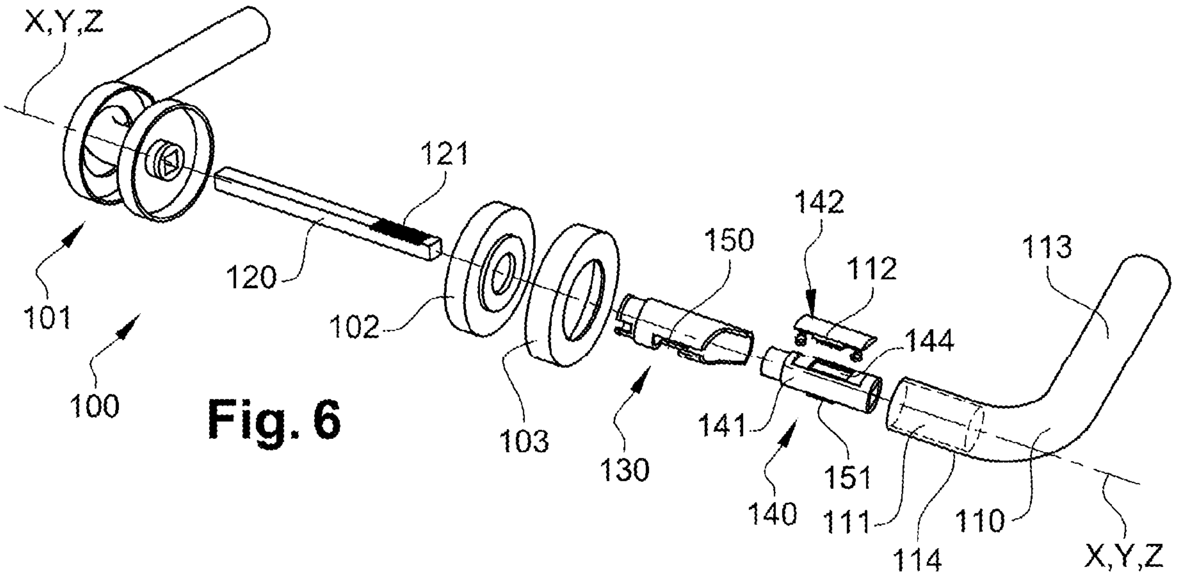
FIG. 6 is an exploded view of a handle assembly according to the invention according to a variant of the first embodiment illustrated in FIG. 1.
Figure 7:
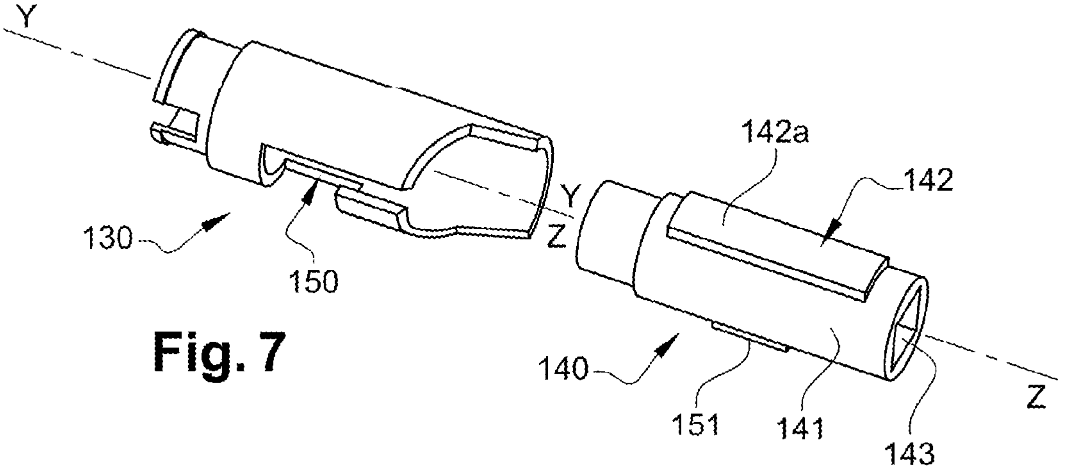
FIG. 7 is an exploded perspective view of the assembly of the insert with the adapter of the handle assembly according to FIG. 6.
Figure 8:
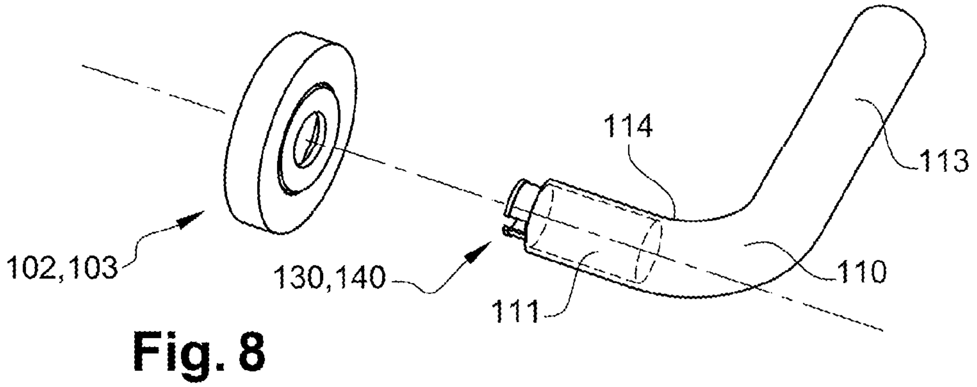
FIG. 8 is an exploded perspective view of the pre-assembly of the first handle of the handle assembly according to FIG. 6, FIGS. 9 to 12 illustrate the steps of the assembly method of the handle assembly according to the invention, according to the first embodiment applicable to the variant of the first embodiment on an opening leaf.

The set of steps detailed in FIGS. 9 to 20 are applicable to the variant of the first embodiment illustrated in FIGS. 6 to 8, an additional step of positioning the rose 102 and its cover 103 being carried out before the assembly of the first handle 110 on the square spindle 120, except in the case where the rose is secured with the handle 110 in particular by a resilient ring called a “circlip” upstream.

In a first variant of the first embodiment that is not shown, the movable part 142 can be in a single piece with the main body 141, the stroke of the movable part 142 and the return to position are obtained by the degree of freedom allowed by the resilient connection with the main body of the adapter 140.

In a second variant that is not shown, the insert 130 can be omitted and the shaped ramp 132 can be arranged directly in the recess 111 of the handle 110 and also the locking member 150.

In the first embodiment and all the variants described above, the movement in rotation of the first handle 110 can only be operated in a clockwise direction. In a third variant that is not shown, the movement of the first handle 110 in rotation can be performed in a clockwise direction or in an anticlockwise direction as a function of the opening on the right or the left of the opening leaf. To this end, in the third variant that is not shown, the ramp 132 is symmetrical and has a first end and a second end convergent towards a central portion, from the first end to the central portion the ramp descends and from the central portion to the second end the ramp 132 ascends. Moreover, the locking member 150, arranged on the insert 130, is enlarged radially so that the complementary locking member 151 abuts one side or the other of the locking member 150 allowing either locking in the clockwise direction or locking in the anticlockwise direction. Furthermore, the square spindle 120 must have at least two faces equipped with reliefs 121 in order to allow the catching of the complementary relief 112 of the clamp 142 on one side or the other of the square spindle 120 according to the assembly position.

The second embodiment will now be described with reference to FIGS. 44 to 55.

According to the second embodiment, the handle assembly 100 comprises a first single handle 110 mounted blind on an opening leaf 200.

Figure 44:
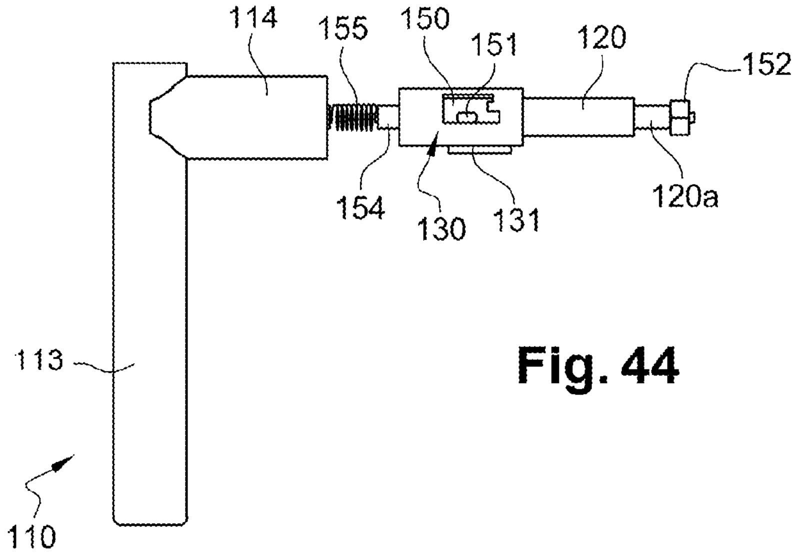
FIG. 44 is an exploded side view of a handle assembly according to a second embodiment.

FIG. 44 illustrates the different components of the handle assembly 100 according to the second embodiment. The handle assembly 100 comprises a handle 110, a square spindle 120, an insert 130, a pawl 152, a drive rod 153 of the pawl 152 and drive pin 154 of the drive rod 153.

According to the second embodiment, the square spindle 120 comprises a complementary locking member 151 directly arranged on its outer surface and intended to cooperate with a locking member 150 arranged on the insert 130.

The square spindle 120 according to the second embodiment has a transverse section that is globally circular except at least one end part 120*a* with a square or rectangular transverse section having a shape corresponding to the shape of the opening leaf mechanism 200 and more particularly to the follower of the opening leaf mechanism 200.

Figure 46:
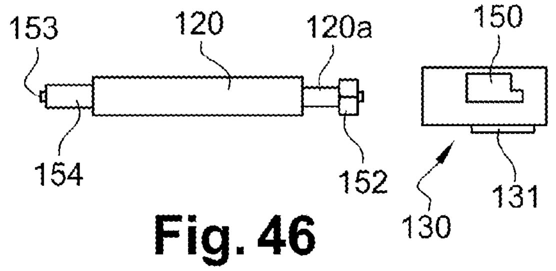
FIG. 46 is an exploded view of the square spindle and of the insert of the assembly shown in FIG. 44.

The square spindle 120 according to the second embodiment comprises a through orifice 122 extending longitudinally through the square spindle 120 and shaped to partially house a drive rod 153, as can be seen in FIG. 46 for example. The drive pin 154 is mounted to a first end of the drive rod 153 and is shaped to be housed in the first handle 110. The pawl 152 is mounted on the other end of the drive rod 153 and is shaped to pass through the follower 202 of an opening leaf mechanism 201. In this embodiment, the pawl 152 has a 45° angle in its locked position with respect to the square spindle of the follower 202, which allows the fastening of the first handle 110 to the opening leaf 200.

In addition, a spring 155 is arranged in the recess 111 of the first handle 110 and abuts against the drive pin 154, itself housed in the recess 111.

According to the second embodiment, the pawl 152 and the drive pin 154 are crimped on the drive rod 153. The drive pin 154 cooperates with a counter-shape provided in the first handle 110, but must remain free in translation to allow the engagement of the complementary locking member 151 in the locking member 150.

Figure 45:
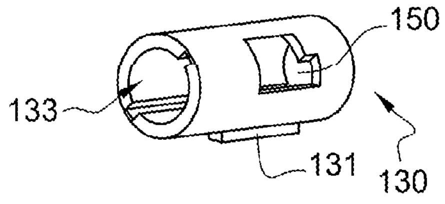
FIG. 45 is a perspective view of the insert of the handle assembly illustrated in FIG. 44.

According to the second embodiment, the insert 130, illustrated in FIG. 45, is intended to be integrated in the inner volume of the recess 111 of the first handle 110, as will be seen in the remainder of the description. In the second embodiment, the insert 130 comprises at least one guide element 131 configured to cooperate with a complementary guide element (not shown) arranged in the inner wall of the recess 111. In this example, the guide element 131 is a pin and the complementary guide element is a recess shaped to receive the pin. Of course, the guide element 131 can take other forms such as a hollow or a rib or a groove and the complementary guide element 111*b* can respectively have the shape of a pin or a groove, or a rib. In addition, it should be noted that the guide element and the complementary guide element are optional and may not be present.

In the second embodiment, the locking member 150 is arranged on the insert 130, on the wall of the insert 130. The locking member 150 is a notch intended to cooperate with a complementary locking member 151 of the spur type arranged on the square spindle 120. The locking member 150 extends over a part of the circumference of the insert 130 and forms with the complementary locking member 151 a bayonet fitting system.

Figure 47:
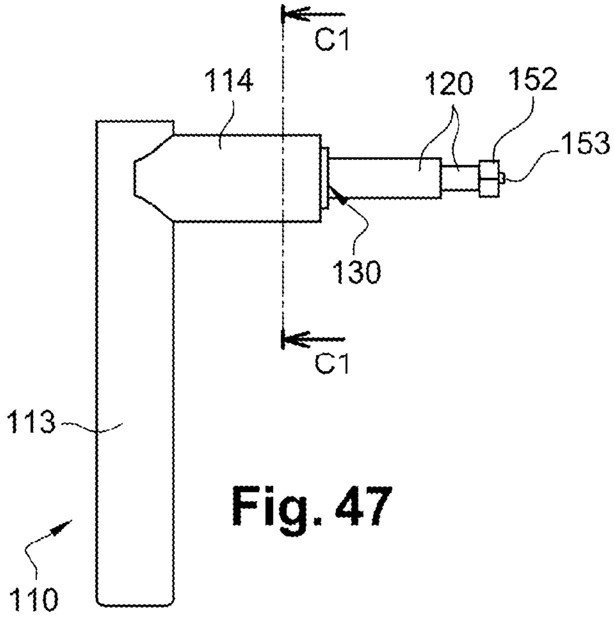
FIG. 47 is a side view of the assembly illustrated in FIG. 44.
Figure 48:
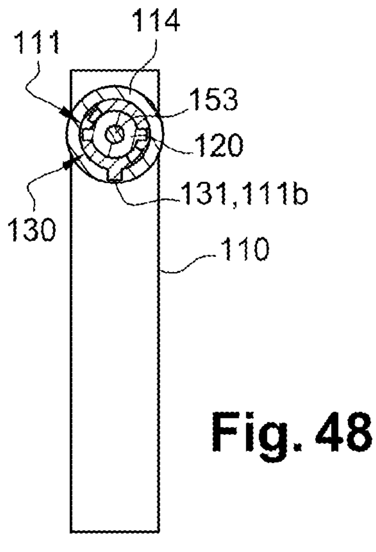
FIG. 48 is a cross section view along the axis C1-C1 shown in FIG. 47, FIGS. 49 to 55 illustrate the assembly steps of the handle assembly according to the second embodiment shown in FIG. 44.

In FIGS. 47 and 48 the handle assembly according to the second embodiment is illustrated assembled.

The method for assembling the handle assembly 100 according to the second embodiment will now be described with reference to FIGS. 49 to 55.

Figure 49:
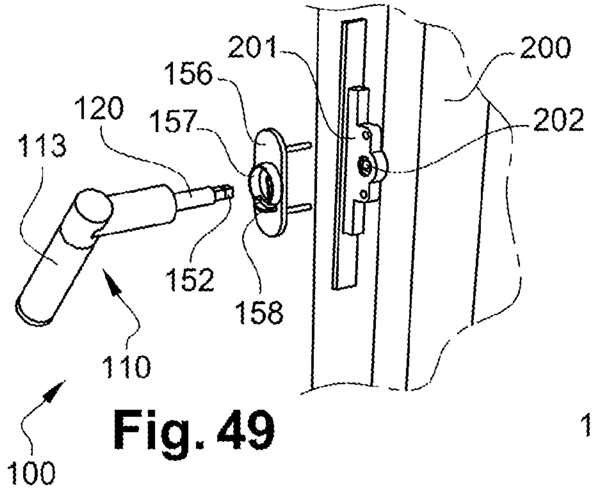

In a first step illustrated in FIG. 49, a base plate 156 is mounted on the opening leaf 200, the base plate 156 comprising at least one receiving orifice 157 of the first handle 110 and an outer lock 158 of the first handle 110. Preferentially, the base plate 156 is fastened on the opening leaf 200, the receiving orifice 157 being arranged opposite the follower 202 of the mechanism 201 of the opening leaf 200 and the outer lock 158 of the base plate 156 is in the unlocked position.

In a variant that is not shown, a spring is placed between the base plate 156 and the first handle 110 so as to maintain the locked position of the locking members 150, 151.

Figure 50:
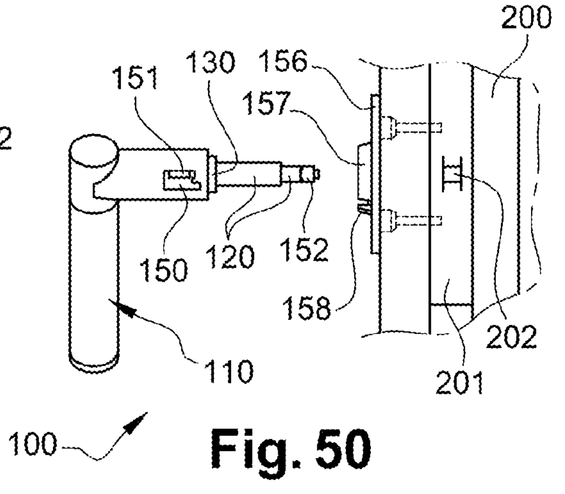

In a second step illustrated in FIG. 50, the first handle 110 is brought towards the assembled base plate 156. The pawl 152, and optionally, a portion of the square spindle 120 pass through the follower 202 of the opening leaf 200. The pawl being in a passing position i.e. the square spindle 120 having faces coplanar with those of the pawl 152. In this second step, the grip portion 113 of the first handle 110 is oriented along an axis secant and non-perpendicular to an axis that is vertical and normal to the ground for example.

Figure 51:
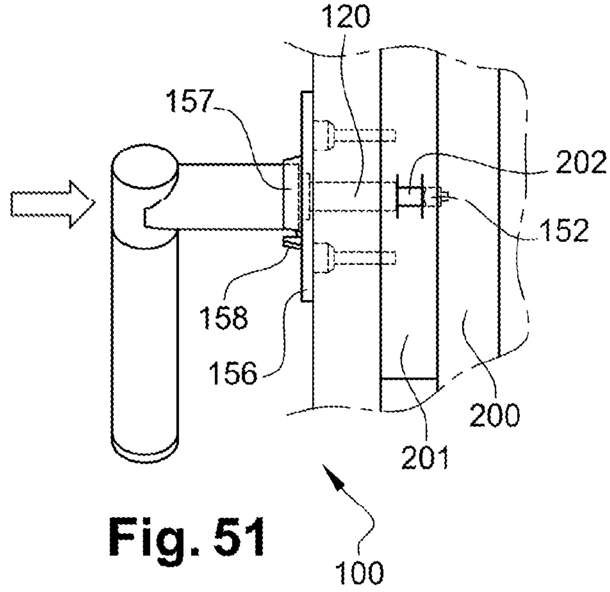

In a third step illustrated in FIG. 51, the first handle 110 is inserted into the opening leaf 200 through the base plate 156, so that: the pawl 152 passes through the follower 202 and beyond, the recess portion 114 of the handle 110 is placed flat against the opening leaf 200, in the receiving orifice 157, the spring 155 is compressed inside the recess portion 114 of the first handle 110.

Figure 52:
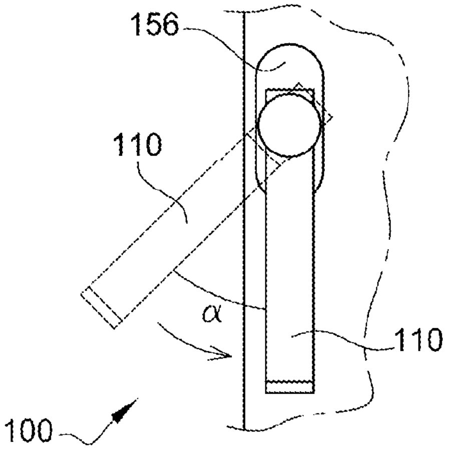
Figure 54:
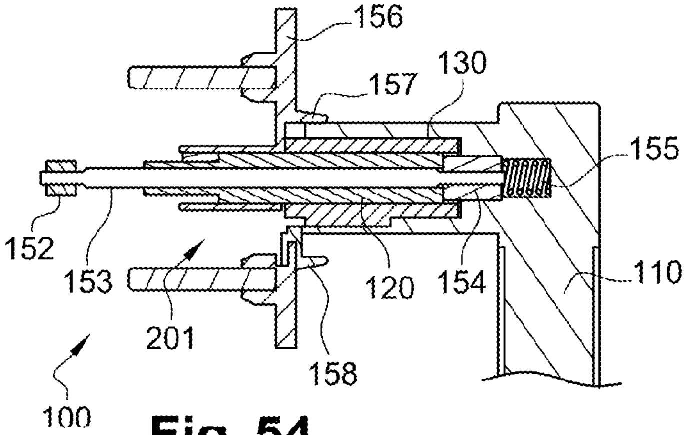

In a fourth step illustrated in FIGS. 52 and 54, the first handle 110 is rotated about the axis of the square spindle 120 by an angle α, preferentially 45°, preferentially in an actuating direction of rotation of the handle, in this case in the clockwise direction. This rotation drives the rotation of the pawl 152 with respect to the follower 202, which remains fixed, so that the latter is in the catching position in which the pawl 152 can no longer leave the follower 202.

Figure 53:
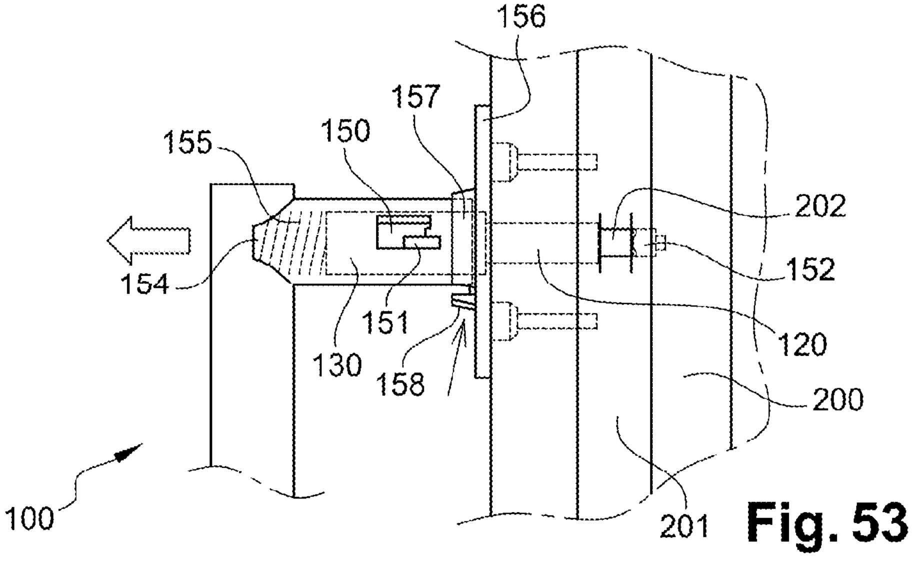
Figure 55:
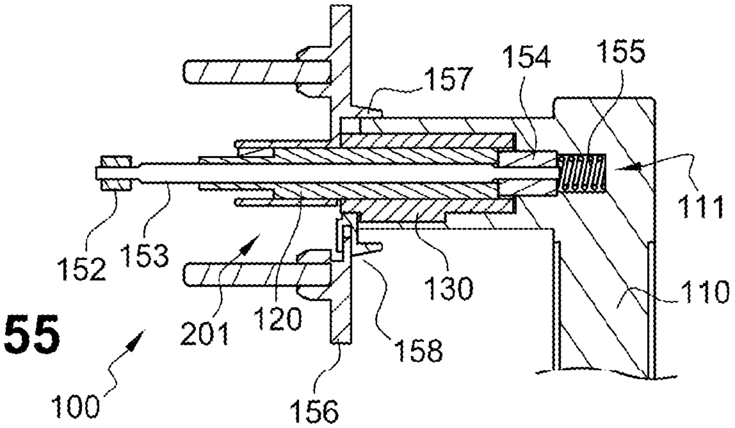

In a fifth step illustrated in FIG. 53, the first handle 110 is released so that the spring 155 is no longer compressed. By releasing the compression, the complementary locking member 151 of the square spindle 120 is housed in the locking member 150 of the insert 130. Following this release, the outer lock 158 of the base plate 156 is placed in the locked position. In this locked position, the outer lock 158 cooperates with a shoulder arranged on the insert 130 to immobilize the latter. In this locked position, the handle can no longer be placed flat against the opening leaf which has the effect of immobilizing the bayonet in its position and therefore of immobilizing the first handle 110 with respect to the opening leaf 200 as illustrated in FIG. 55.

Once these steps have been carried out, the first handle 110 is ready to be used to actuate the opening leaf 200 which can for example be a window. By rotating the first handle 110, the opening leaf mechanism 200 is driven and can allow the opening of the opening leaf 200 without coming away from the first handle 110. It can also allow other manipulations such as positioning in the tilt and turn position.

Figure 56:
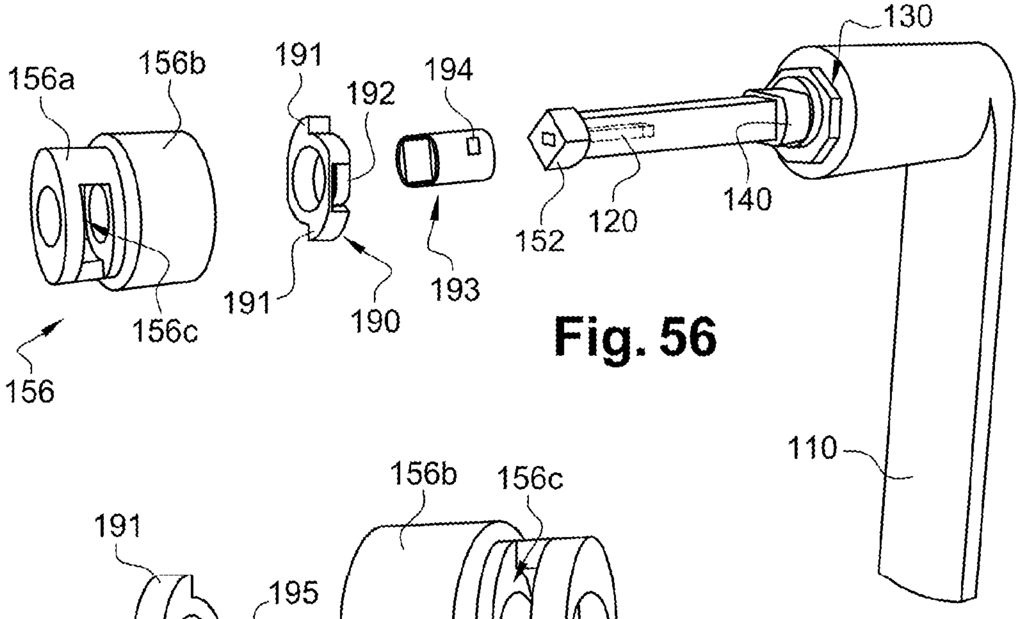
FIG. 56 is an exploded perspective view of a handle assembly according to the second embodiment equipped with a system for securing the base plate.
Figure 57:
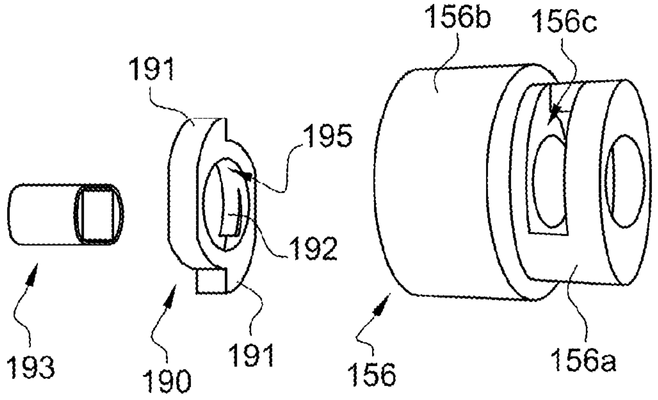
FIG. 57 illustrates the parts of the system for securing the base plate represented in FIG. 56 from another viewpoint.
Figure 58:
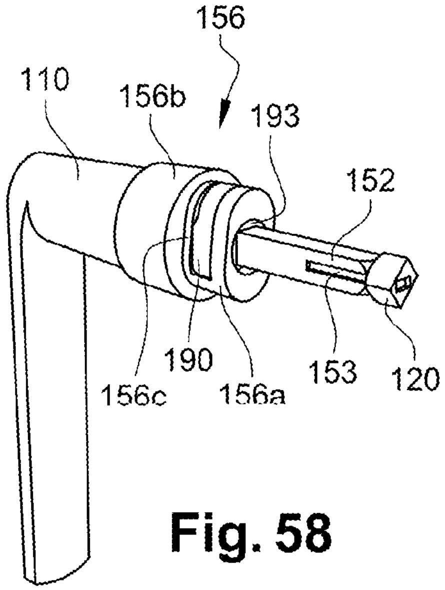
FIG. 58 is a perspective view of the handle assembly shown in FIG. 56, the system for securing the base plate being mounted on the handle assembly.

In a first embodiment of the securing device shown in FIGS. 56 to 76, the securing device includes the base plate 156, a lock 190, a contact surface 193. More particularly, the base plate 156 comprises a first portion 156*a* having a recess 156*c* shaped to house the lock 190 as illustrated in FIGS. 56, 57 and 58. The first portion 156*a* of the base plate 156 is intended to pass through the opening leaf 200 and project on a side of the opening leaf opposite the side of the opening leaf 200 where the first handle 110 is positioned, as can be seen in particular in FIG. 63. The base plate 156 comprises a second portion 156*b* in which the receiving orifice 157 of the first handle 110 is arranged.

In addition, the lock 190 is oblong in shape, comprising two diametrically opposed vanes 191, a clip 192 which is in the form of an elastically deformable bracket and arranged on one side of the lock between the vanes 191. The lock 190 comprises an inner lug 195 intended to cooperate with a portion of the contact surface 193 as can be seen in particular in FIGS. 67, 69, 71, 74 and 76.

In addition, the contact surface 193, shaped to be positioned in the lock 190 comprises a projecting stop spur 194 configured to cooperate in particular with the clip 192 in order to anchor the securing of the base plate 156 in the opening leaf 200. Advantageously, the contact surface 193 is secured to the square spindle 120.

The assembly of such a securing device will now be described with reference to FIGS. 59 to 76.

Figure 59:
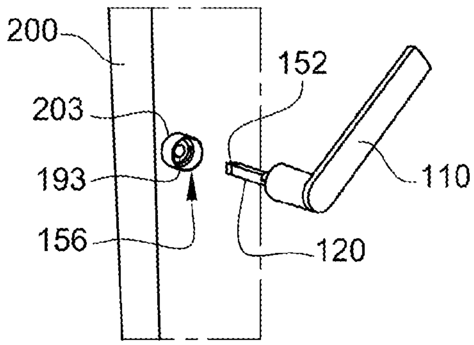
FIGS. 59 to 76 illustrate the different steps for assembling the handle assembly shown in FIG. 56 on an opening leaf.
Figure 60:
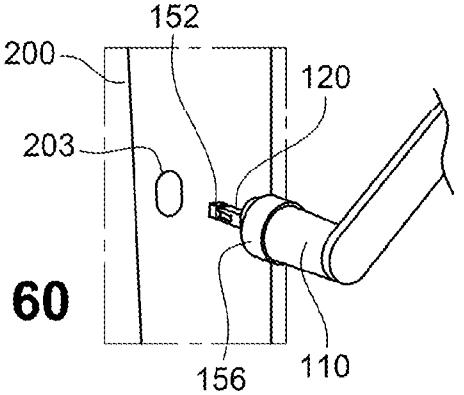

The base plate 156 can be inserted in two different ways illustrated in FIGS. 59 and 60. Either the base plate 156 is inserted directly in the opening leaf aperture 203 as illustrated in FIG. 59, or the base plate 156 is mounted on the first handle 110 and inserted in the opening leaf aperture 203 with said first handle 110 as illustrated in FIG. 60. Regardless of the way of inserting the base plate 156 in the opening leaf aperture 203, the first handle 110 must be oriented by an angle β with respect to a vertical line, the angle β being acute and preferentially approximately 45°, as illustrated in FIG. 61.

Figure 61:
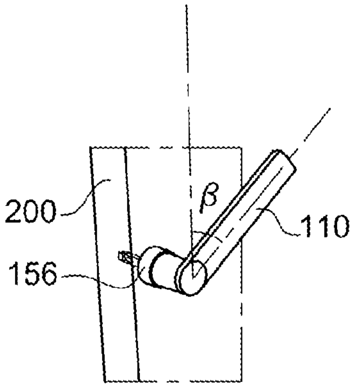
Figure 62:
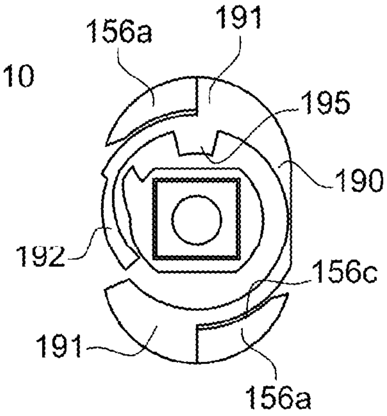
Figure 63:
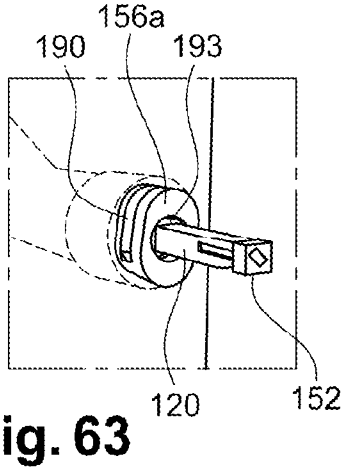
Figure 64:
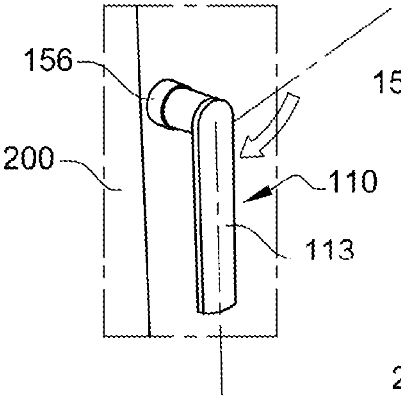
Figure 65:
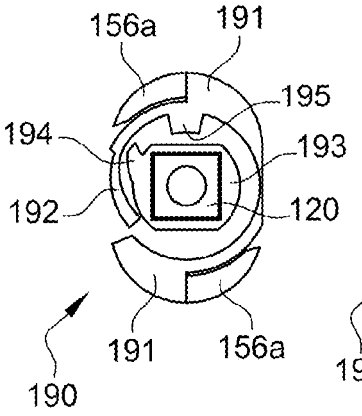

Once the base plate 156 is inserted and the first handle 110 positioned as illustrated in FIGS. 61, 62 and 63, the first handle 110 is rotated with respect to the square spindle 120, as illustrated in FIGS. 64 and 65, to secure the first handle 110 with the square spindle 120 and the square spindle 120 with the follower 201 (not shown), in the case of a window handle. The square spindle 120 as well as the contact surface 193 remain immobile as can be seen in FIG. 65. In this step, similar to the step shown in FIG. 52, the grip portion 113 of the first handle 110 is oriented vertically downwards, i.e. the free end of the first handle points towards the ground.

Figure 66:
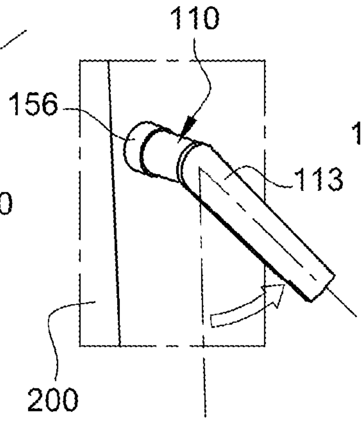
Figure 68:
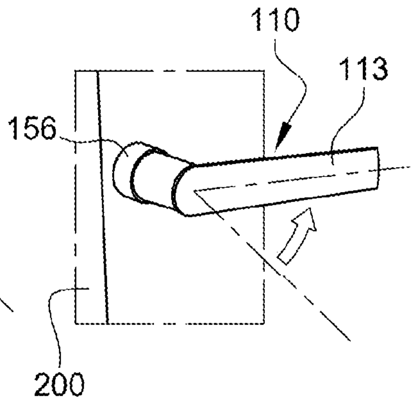
Figure 67:
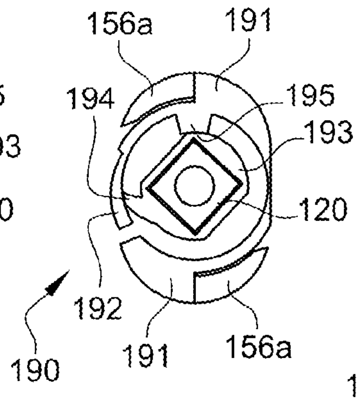
Figure 69:
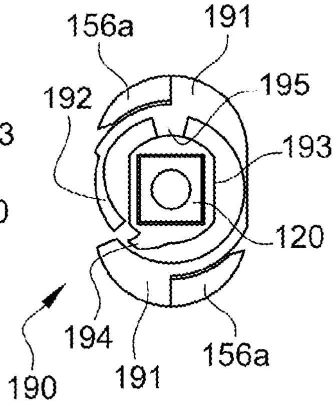
Figure 70:
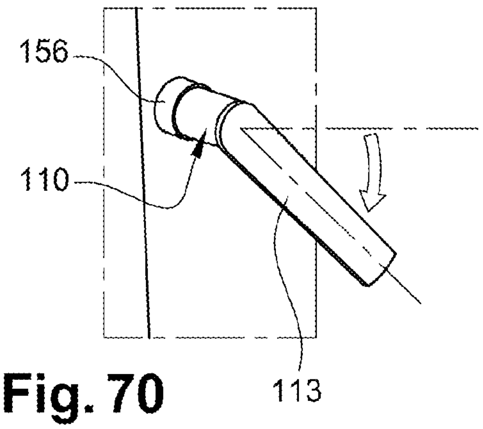

Then, the first handle 110 is again rotated by an angle, preferentially approximately 45°, upwards, the rotation of the first handle 110 driving the square spindle 120 and the contact surface 193 in rotation as illustrated in FIGS. 66 and 67. As can be seen in FIG. 67, by this new rotation, the stop spur 194 opens the clip 192 of the lock 190. Rotation in this direction continues, until the grip portion 113 of the first handle 110 is substantially horizontal as illustrated in FIG. 68. This continuing rotation allows the stop spur 194 to pass beyond the clip 192 of the lock 190 as illustrated in FIG. 69.

Figure 73:
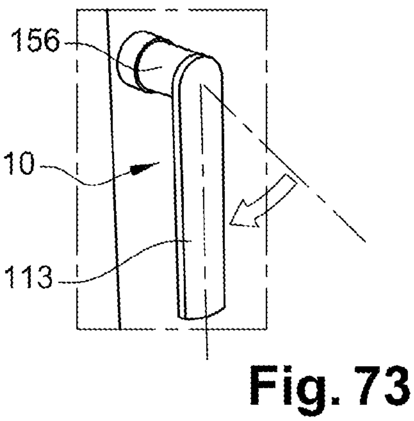
Figure 71:
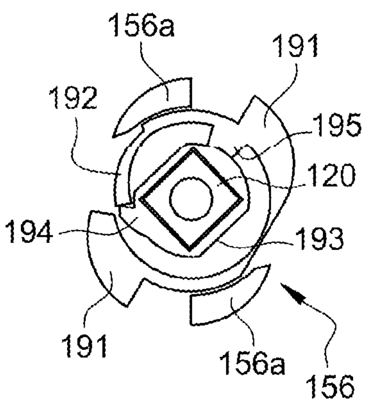
Figure 74:
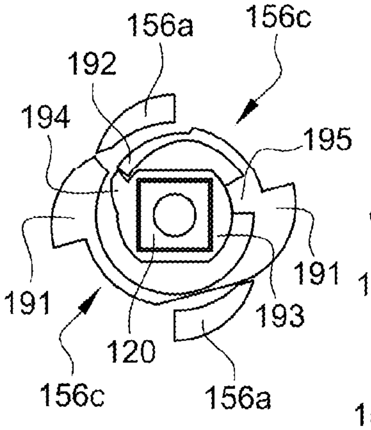
Figure 76:
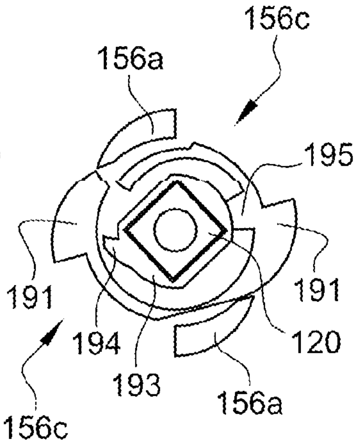
Figure 72:
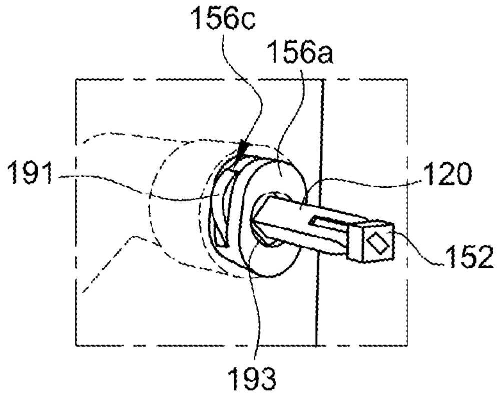
Figure 75:
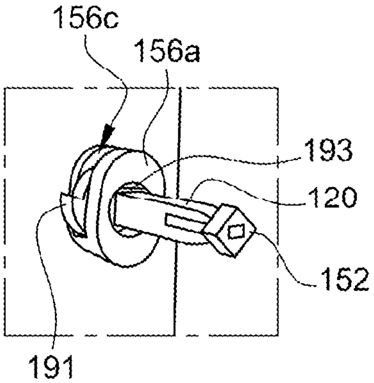
Figure 77:
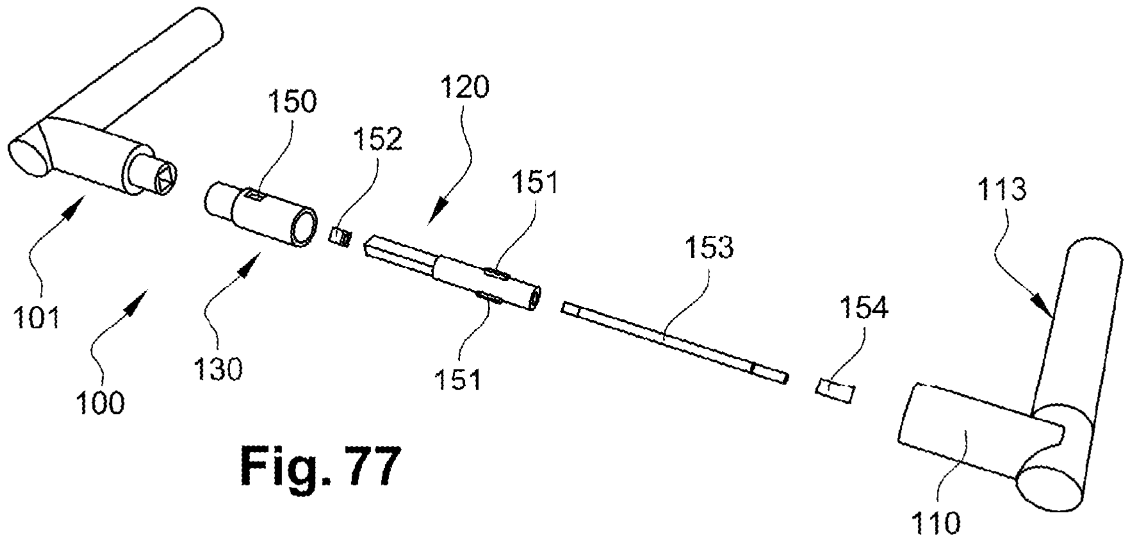
FIG. 77 is an exploded view of a handle assembly according to the invention according to a third embodiment.
Figure 78:
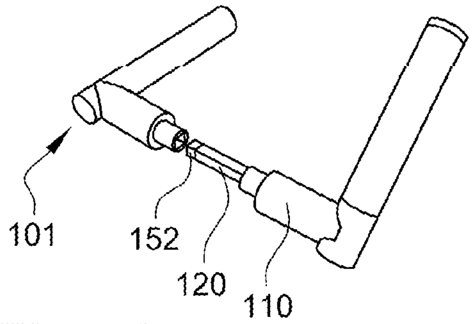
FIG. 78 is a perspective view of the handle assembly illustrated in FIG. 77 in assembly position.

Then, the first handle 110 is rotated in the direction opposite to that previously used, so that the stop spur 194 drives the base plate lock 190 by means of the clip 192 until the vanes 191 abut respectively each against a portion of the base plate recess 156*c* as illustrated in FIGS. 73 to 75. The lock 190 then remains in place and secures the base plate 156 with the opening leaf 200. Finally, in normal use of the first handle 110 of the handle assembly 100, the lock 190 remains in place while opening and closing the opening leaf 200 as illustrated in FIGS. 74 and 76.

The securing device can cover two other embodiments illustrated in FIGS. 29 to 43. These two embodiments are described integrated in a return system 170 of the first handle but could be omitted from the return system.

In this case, the securing device according to these two embodiments would comprise and expansive base plate 171 and an expansion cam 172 as described with reference to FIGS. 29 to 43.

The third embodiment will now be described with reference to FIGS. 77 to 81.

Figure 81:
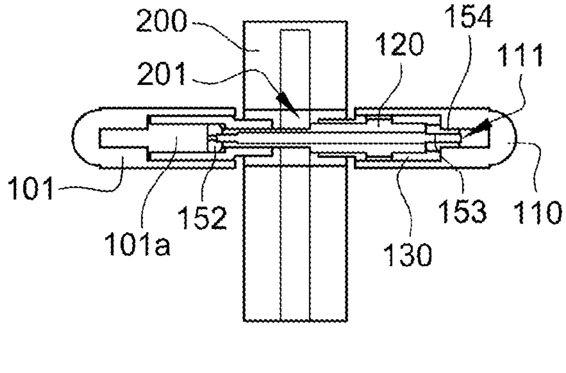

The third embodiment differs from the first embodiment only in that the handle assembly 100 comprises a first handle 110 and a second handle 101 antagonist to the first handle 110, the first handle 110 and the second handle 101 being positioned on either side of the opening leaf 200. Thus, the catching of the first handle 110 by means of the pawl 152 no longer takes place behind the follower 202 as in the second embodiment but behind the square recess arranged in the opposite handle as illustrated in FIG. 81.

The remainder of the characteristics and in particular the components of the handle assembly 100 and their functions are identical to those of the second embodiment.

Figure 79:
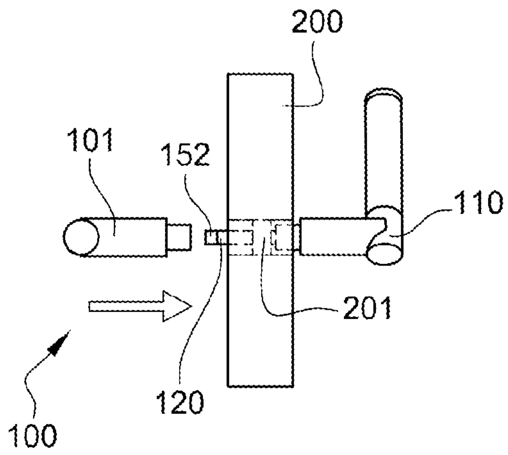
FIGS. 79 to 81 illustrate the steps for assembling the handle assembly illustrated in FIG. 77 on an opening leaf.

In FIG. 79, according to a first assembly step, the first handle 110 is placed against the opening leaf 200, the pawl 152 being aligned with the square spindle 120 and projecting with respect to the opening leaf and the opening leaf mechanism 201. The second handle 101 is placed opposite the pawl 152, on the other side of the opening leaf 200 with respect to the first handle 110. In this step, the first handle is raised by an angle preferentially equal to 45°.

Figure 80:
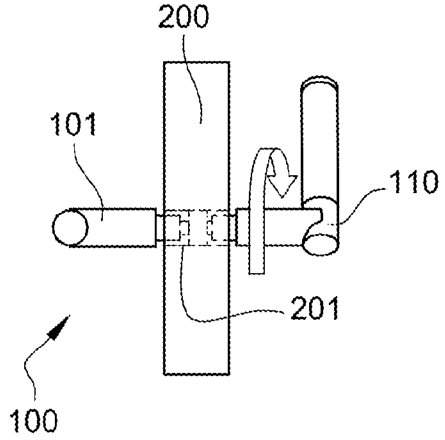

In FIG. 80, according to a second assembly step, the second handle 101 is introduced so as to be fitted on the square spindle 120 projecting with respect to the opening leaf 200. The first handle 110 and the second handle 101 are brought to abut against the opening leaf 200 on either side of said opening leaf 200, the first handle still being raised, unlike the second handle 101, which has its grip portion horizontal, as illustrated in FIG. 80.

Following this second step, the first handle 110 is rotated in order to be realigned with the second handle 101, by an angle preferentially equal to −45°, so that the grip portion 113 of the first handle is horizontal as illustrated in FIG. 81. This rotation drives the rotation of the pawl 152 in the second handle 101 so that the latter has an abutment configuration in which it can no longer leave the second handle 101.

The fourth embodiment will now be described with reference to FIGS. 82 to 99.

The fourth embodiment differs from the first embodiment in that it comprises a catch system. The catch system of the handle assembly 100 according to the fourth embodiment is similar to that of the second embodiment.

The fourth embodiment differs from the second embodiment in that it comprises a system for adjusting the depth of the first handle by cooperation of the relief. The system for adjusting the handle assembly according to the fourth embodiment is similar to that of the first embodiment.

In the fourth embodiment, the handle assembly 100 comprises a first single handle 110 mounted blind on an opening leaf 200. Of course and according to a variant that is not shown, the handle assembly 100 according to the fourth embodiment can comprise a second handle 101, reference will be made to the assembly of the variant of the second embodiment applicable in this case.

Figure 82:
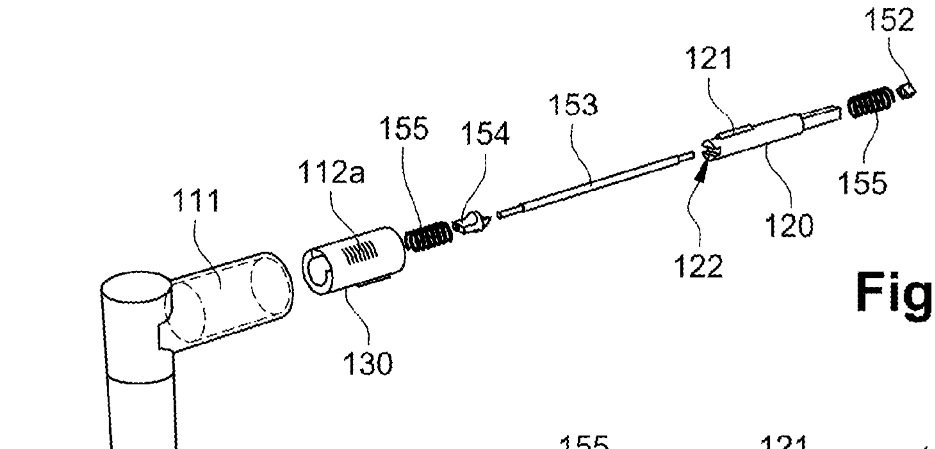
FIG. 82 is an exploded view of a handle assembly according to the invention according to a fourth embodiment.
Figure 83:
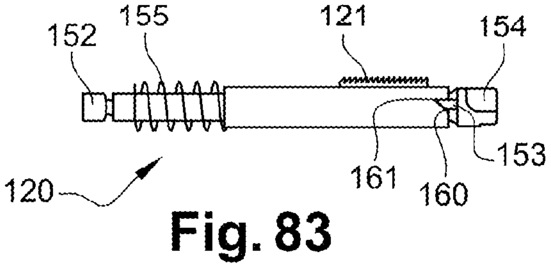
FIG. 83 is a side view of the square spindle of the handle assembly illustrated in FIG. 82.

In the fourth embodiment and as can be seen in FIG. 82, the handle assembly 100 comprises a first handle 110, an insert 130, a square spindle 120, a drive pin 154, a drive rod 153, a pawl 152 and a spring 155.

In the fourth embodiment, the square spindle 120 comprises a through orifice 122 as illustrated in FIG. 82, in which the drive rod 153 is housed. The drive pin 154 is arranged on one end of the drive rod 153 and the pawl 152 is arranged on the other end. The spring 155 is mounted on a portion of the square spindle 120 behind the pawl 152. In addition, the square spindle 120 according to the fourth embodiment comprises a relief 121 intended to cooperate with a complementary relief 112 positioned on the insert 130.

The square spindle 120 comprises a notch 161 arranged on an end receiving the drive pin 154.

The drive pin 154 comprises a spur 160 intended to be housed in the notch 161 in order to lock the square spindle mounted on the opening leaf 200.

The drive pin 154 is mounted mobile in rotation with respect to the square spindle 120.

In the fourth embodiment, the insert 130 comprises a receiving orifice 133 delimited by an inner wall 134. The receiving orifice 133 is intended to partially accommodate the square spindle 120 and the drive pin 154. The inner wall 134 of the insert 130 comprises two complementary reliefs 112*a*, 112*b* shaped to cooperate with the relief 121 arranged on the square spindle 120. In the example illustrated in FIG. 84, the two complementary reliefs 112*a*, 112*b* extend over a part of the circumference of the inner wall 134 of the insert 130 and over a part of the length of the insert 130. The first complementary relief 112*a* and the second complementary relief 112*b* are spaced apart from one another by a space without a relief 112*c*.

The insert 130 according to the fourth embodiment can comprise a guide element 131 cooperating with a complementary guide element 111*b* positioned in the recess 111 of the first handle 110, when the insert 130 is housed in the first handle 110.

The rotation of the handle on the square spindle 120 is limited by the stops 112*d* arranged on either side of the complementary relief or reliefs 112, 112*a*, 112*b*.

In a variant that is not shown, the inner wall 134 of the insert 130 comprises a single complementary relief 112 shaped to cooperate with the relief 121 arranged on the square spindle 120.

The method for assembling the handle assembly 100 according to the fourth embodiment will now be described with reference to FIGS. 86 to 99.

Figure 86:
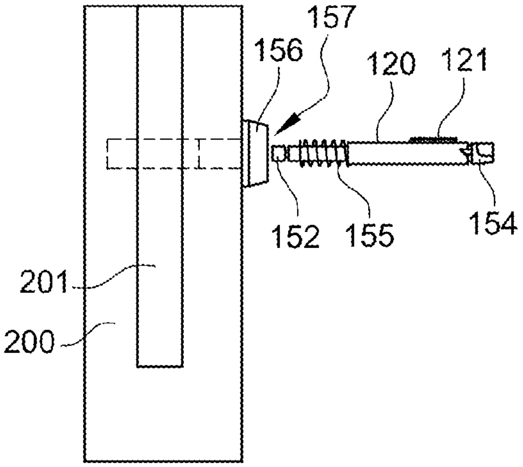
FIGS. 86 to 93 illustrate the method for assembling the handle assembly according to the invention according to the fourth embodiment on an opening leaf.

In a first step illustrated in FIG. 86, the base plate 156 is mounted on the opening leaf 200. This base plate 156 can be fastened by screwing or other means.

Figure 87:
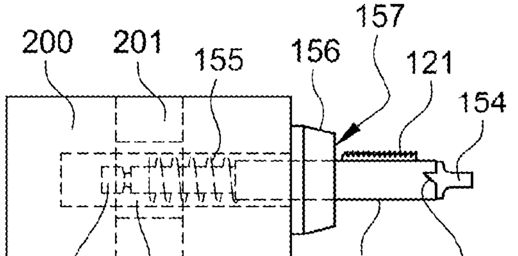
Figure 88:
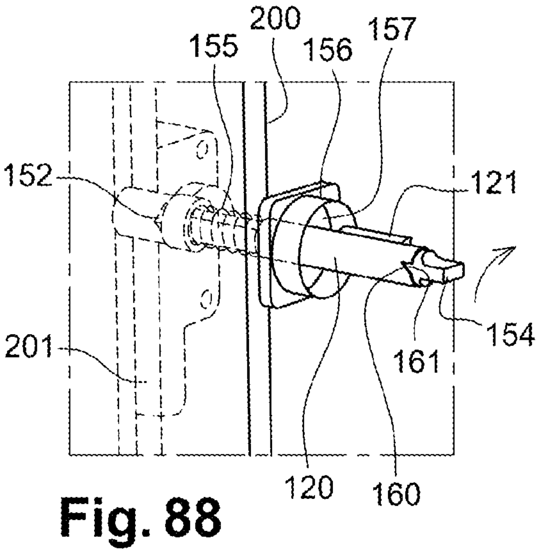

In a second step illustrated in FIG. 87, the mounted square spindle 120 is inserted in the opening leaf mechanism 201, through the base plate 156. In the present description, by “mounted square spindle” is meant the assembly of the square spindle 120, the drive rod 153, the drive pin 154 and the pawl 152 and the spring 155.

Figure 89:
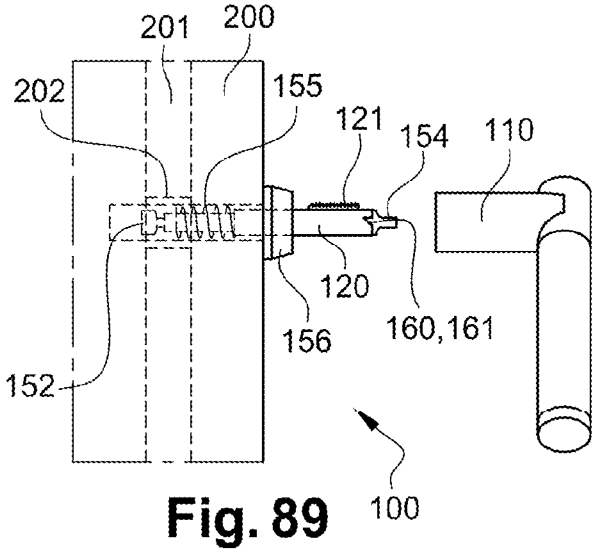

In a third step and as can be seen in FIG. 89, the spring 155 is compressed in order to cause the pawl 152 to project beyond the follower 202. Advantageously, the positioning of the mounted square spindle is carried out without tools. In this step, the pawl 152 is in the passing position and is thus aligned with the square spindle 120. A rotation of 45° of the drive pin 154 makes it possible to position the pawl 152 at 45° to the follower 202 and to allow the locking of the square spindle 120 mounted on the opening leaf 200. The spur 161 is housed in the notch 160 in order to maintain the locked position on the opening leaf 200.

Figure 90:
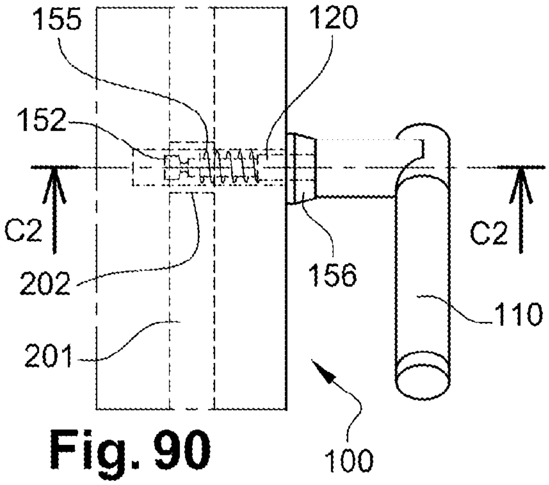
Figure 91:
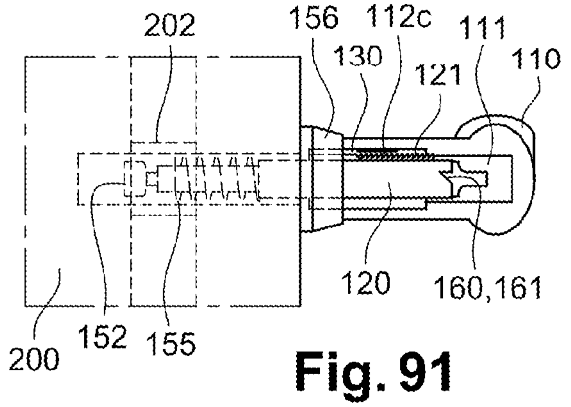

FIGS. 90 and 91 illustrate the mounted square spindle 120, inserted in the opening leaf mechanism 201. The mounted square spindle 120 is configured to be adapted to any thickness of follower 202.

In a fourth step, the first handle 110 is presented at a given angle (here 45°) with respect to the square spindle 120. Then the first handle 110 is inserted on the mounted square spindle as illustrated in FIG. 89. In this position, the first handle 110 slides freely on the square spindle 120 and can be brought to abut on the base plate 156.

Figure 92:
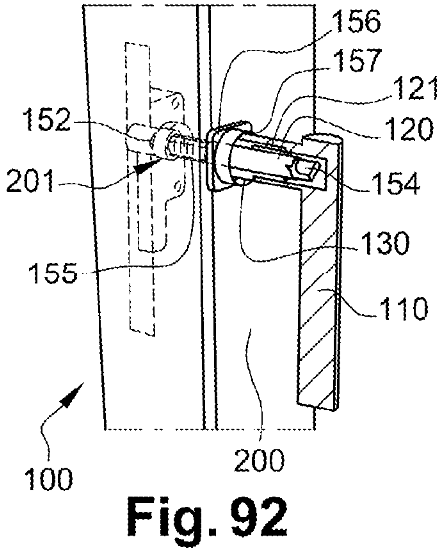
Figure 93:
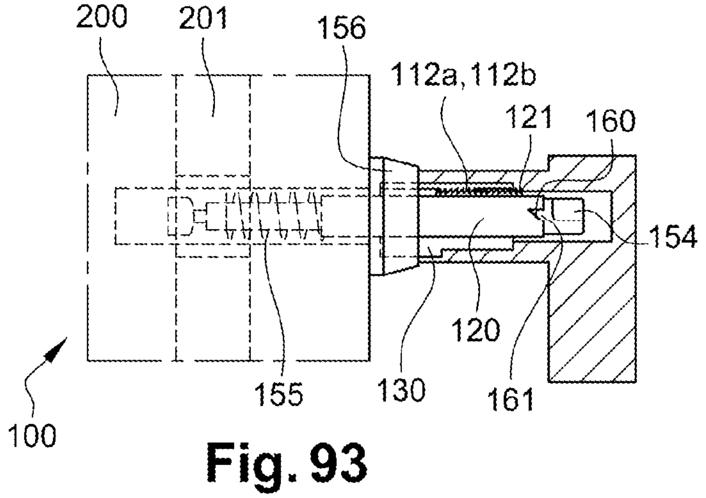

In a fifth step shown in FIGS. 92, 93, the first handle 110 is rotated which makes it possible to mate the relief 112*a* or 112*b* of the insert 130 to with the relief 121 of the square spindle 120. This step corresponds to the securing configuration of the first handle 110.

According to a characteristic of the invention, a latch system (not shown) makes it possible to lock the rotation of the first handle, so that it can be manipulated to control the opening leaf 200 and thus without ever leaving its engaged position. Moreover, it is possible to use a handle assembly 100 intended to be used on an opening leaf of the window type or an opening leaf of the door type. To this end, it is necessary to offset the orientation of the first handle 110 by an angle of 90° at the moment of its insertion on the door.

Figure 84:
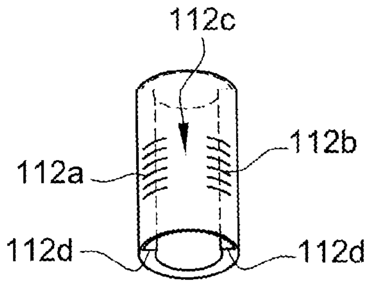
FIG. 84 is a perspective view of the insert of the handle assembly illustrated in FIG. 82.
Figure 85:
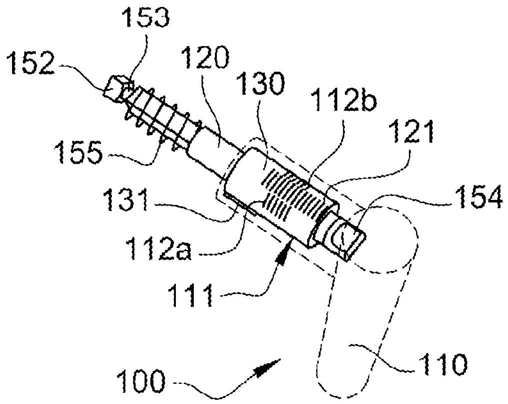
FIG. 85 is a perspective view of the handle assembly of the fourth embodiment.

As illustrated in FIG. 84, the two complementary reliefs 112*a*, 112*b* of the insert make it possible to assemble the same first handle in two opposite directions as required, and as a function of the direction of rotation of the first handle during the fifth step illustrated in FIGS. 92, 93. According to the invention, in the absence of one of the reliefs 112*a* or 112*b*, the locking phase of the first handle 110 only operates in one direction, but this does not thereby limit it in use.

Figure 94:
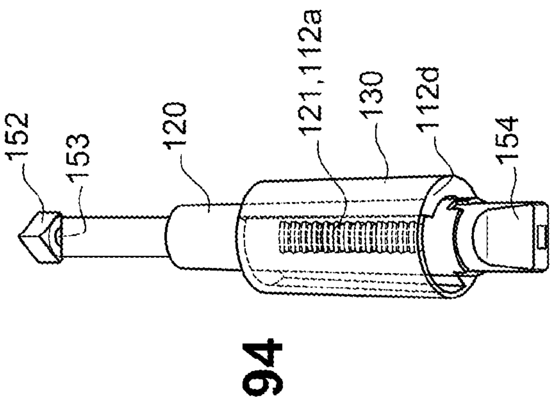
FIGS. 94 to 99 illustrate the steps for locking the handle assembly in FIG. 77, to pass from an initial configuration to a securing configuration.
Figure 95:
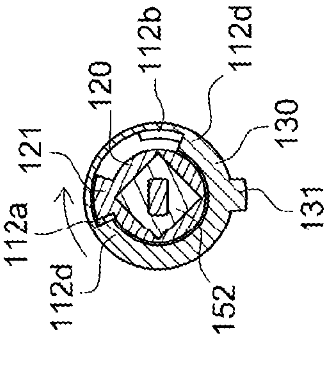
Figure 96:
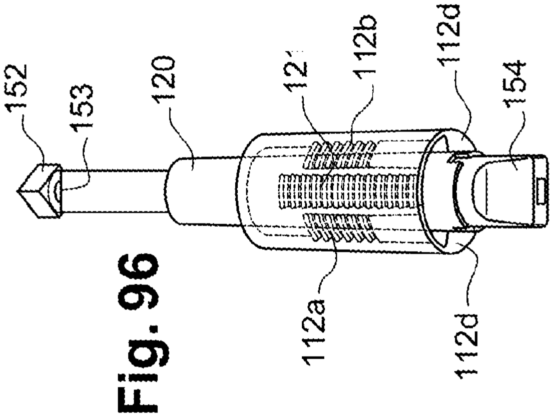
Figure 97:
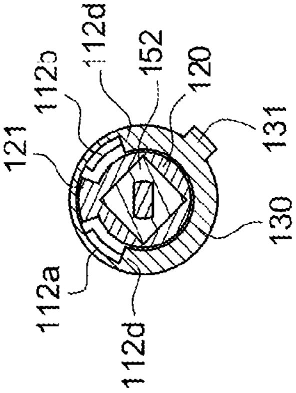
Figure 98:
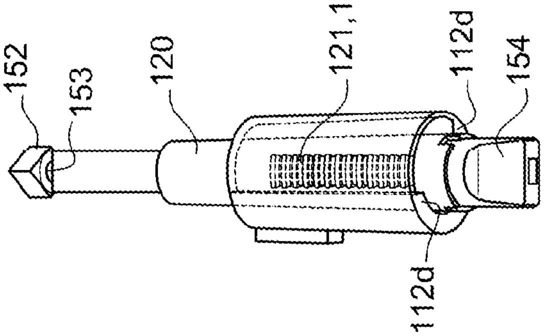

FIGS. 94 to 99 illustrate the principle of two reliefs 112*a*, 112*b* of the insert 130. In FIGS. 94 and 95, the relief 121 of the square spindle 120 is engaged with the first complementary relief 112*a*. In FIGS. 96 and 97, the relief 121 of the square spindle 120 is positioned between the two reliefs 112*a*, 112*b* in a space without a relief 112*c*. In FIGS. 98 and 99, the relief 121 of the square spindle 120 is engaged with the second complementary relief 112*b*.

Regardless of the embodiment of the handle assembly 100 according to the invention, said assembly can integrate a handle return system 170 as illustrated in FIGS. 29 to 43. Advantageously, the return system 170 is applied on the first handle 110 of the handle assembly 100.

In the first embodiment and in the second embodiment of the return system 170, the latter comprises an expansive base plate 171, an expansion cam 172 and a return spring 173.

The parts common to the two first embodiments will now be described.

The expansive base plate 171 is in the shape of a disk comprising a front portion turned towards the first handle 110 and a back portion turned towards the second handle 101 and/or the opening leaf 200 in the case of a handle assembly 100 having a single handle. The back face of the base plate comprises a plurality of elastically deformable blades 174 arranged around a central orifice 175. Preferably, the expansive base plate 171 comprises three blades 174 arranged regularly around the orifice 175. The blades 174 each have a curved shape, for example in the shape of a wave one end of which is curved forming a hook like a spear 176. The blades 174 extend over their thickness i.e. over the segment tangential to the central orifice 175. The blades are configured to extend radially from the central orifice 175 when the latter are stressed.

The expansion cam 172 is in the shape of a ring or a cylinder. The expansion cam 172 comprises a front portion on which a drive spur 177 is positioned, the drive spur 177 being intended to cooperate with the insert 130. More particularly, during the rotation of the first handle 110, the stop spur 139 of the insert 130 abuts against the drive spur 177 so as to allow the driving of the cam. The expansion cam 172 is shaped to interlock in the expansive base plate 171 and more particularly to cooperate with the expansive base plate 171. In addition, the expansion cam 172 comprises a back portion on which a plurality of projections 178 are arranged. Preferentially, the back portion of the cam comprises three projections 178. The projections 178 are regularly distributed and arranged around a central through orifice 179. The projections 178 are in the shape of progressive ramps in one and the same direction of rotation about a longitudinal median axis A-A of the expansion cam 172. The projections 178 are provided at one end with a stop 178*a*, preferentially rounded, which is shaped to cooperate with the blades 174. During the assembly of the return system 170, the centering orifice 175 of the expansive base plate 171 is substantially concentric with the central orifice 179 of the expansion cam 172. Furthermore, at least the back portion of the expansion cam 172 is integrated between the blades 174 without stressing them.

The spring 173 of the return system 170 is preferably in the shape of a spiral with at least one coil. The spring 173 comprises a first end 173*a* shaped to cooperate with the expansive base plate 171. The expansive base plate 171 comprises a recess for receiving said first end 173*a* of the spring 173 intended to ensure the secure support of the end 173*a* of the spring with the expansive base plate 171.

Of course, the spring can have any known shape making it possible to fulfil the same function, such as a tension or compression spring.

The spring 173 comprises a second end 173*b* shaped to cooperate with the first handle 110. In the embodiment shown in FIG. 29, the adapter 140 comprises a recess 141 for receiving said end 173*b*. Other embodiments are possible by arranging the recess for receiving the end 173*b* of the spring 173 in elements of the handle assembly 100 that are mobile with respect to the expansive base plate, such as for example the insert 130 or the body of the handle 110.

In order to mount the handle assembly 100 according to the invention equipped with a return system 170 according to any one from the first embodiment and the second embodiment, on an opening leaf 200, the following steps illustrated by FIGS. 21 to 28 are followed.

Figure 21:
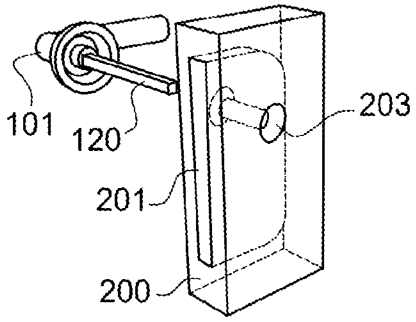
Figure 22:
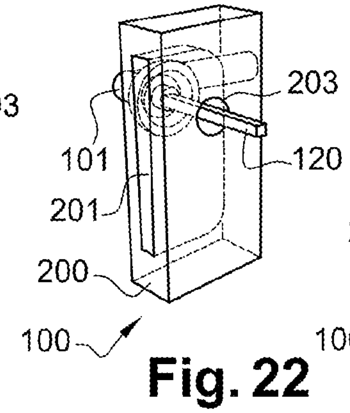

In FIGS. 21 and 22 the positioning of the second handle 101 of the handle assembly 100 on the opening leaf 200 is illustrated. As can be seen, the square spindle 120 is already installed on the second handle 101. The second handle 101 is mounted on the opening leaf 200 so that its grip portion is substantially horizontal. Several fastening systems can be used to fix the second handle 101 to the opening leaf, in the example illustrated in FIG. 22, an adhesive arranged on a face of the rose equipping the second handle 101 is used.

Figure 23:
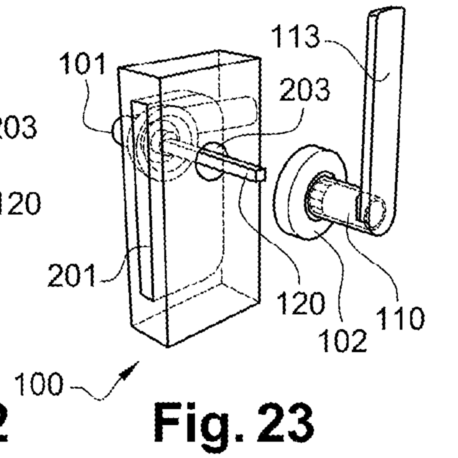
Figure 24:
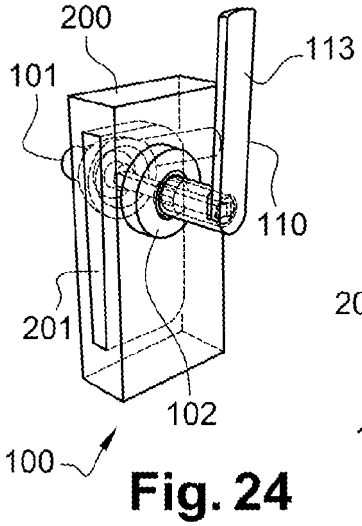

In FIG. 23, the first handle 110 of the handle assembly 100 is presented opposite the orifice of the opening leaf 200 and opposite the square spindle 120 projecting from the opening leaf 200. The grip portion 113 of the first handle 110 is oriented along a substantially vertical axis.

Figure 34:
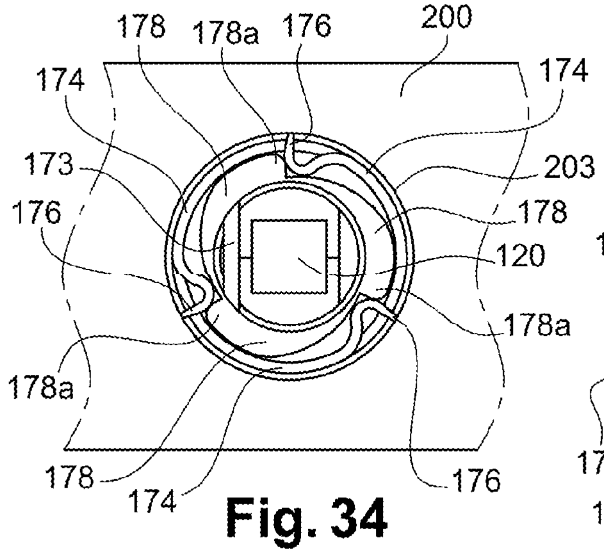

In FIGS. 24, 32, 33 and 34, the first handle 110 is positioned against the opening leaf 200 by being fitted on the projecting square spindle 120. Preferably, the rose 102 of the first handle 110 comprises an adhesive on one face allowing the positioning of the first handle 110 on the opening leaf 200. As can be seen in FIG. 34, the projections 178 are abutted against the spear-shaped ends 176, said ends being radially withdrawn with respect to the opening leaf aperture 203.

Figure 25:
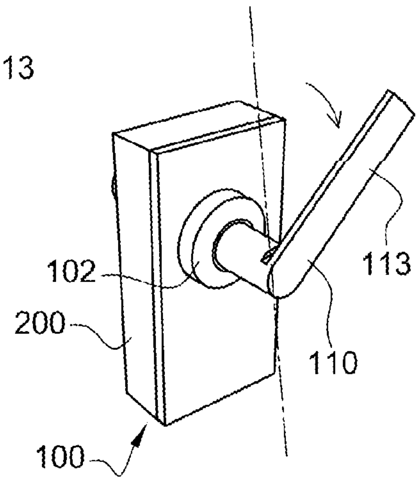
Figure 35:
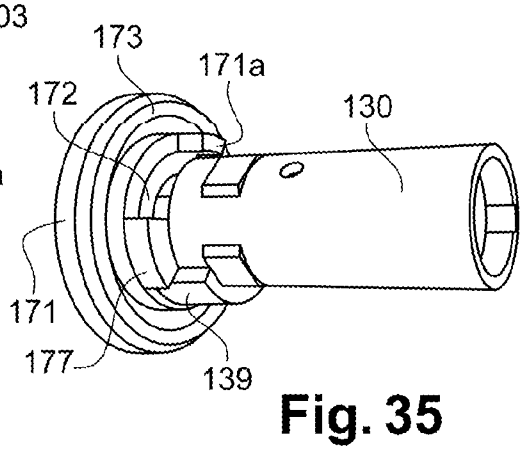

In FIGS. 25 and 35, the first handle 110 is rotated by a first angle of rotation (approximately 45°). This first rotation makes it possible to bring the stop spur 139 arranged on the insert 130 into contact with the drive spur 177 of the expansion cam 172.

Figure 26:
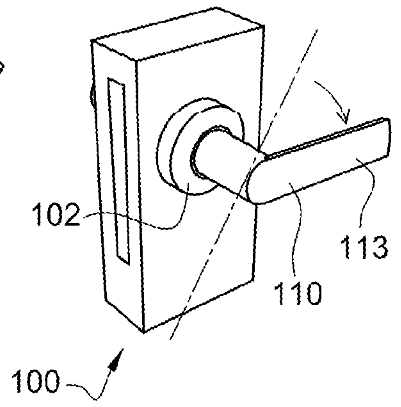
Figure 36:
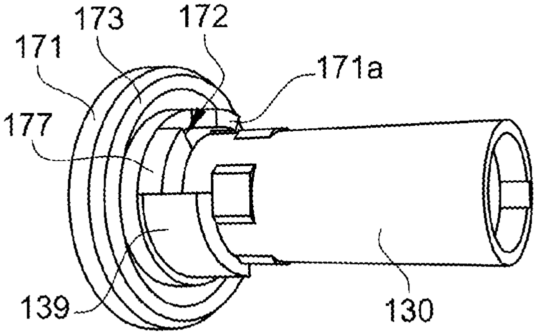
Figure 37:
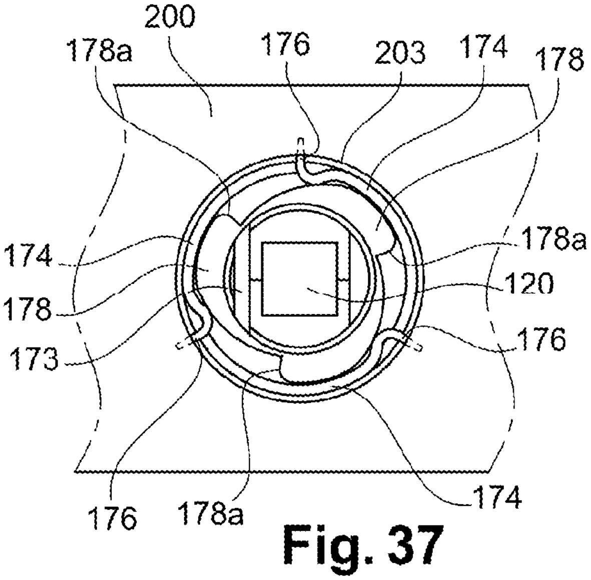

In FIGS. 26, 36 and 37, the rotation of the first handle 110 is continued by a second angle of rotation (approximately 45°) in the same direction of rotation as in FIG. 25, so that the grip portion 113 is substantially horizontal. In this position, the clamp 142 is locked and the expansion cam 172 is driven so that the latter and in particular the projections 178 press against the spear-shaped ends 176 of the blades 174 which are partially deployed in the aperture 203 of the opening leaf 200, penetrating the opening leaf 200, as illustrated in FIG. 37. Once the spears 176 are partially deployed, the first handle 110 is partially secured to the opening leaf 200 and the return system 170 is ready to be used.

Figure 27:
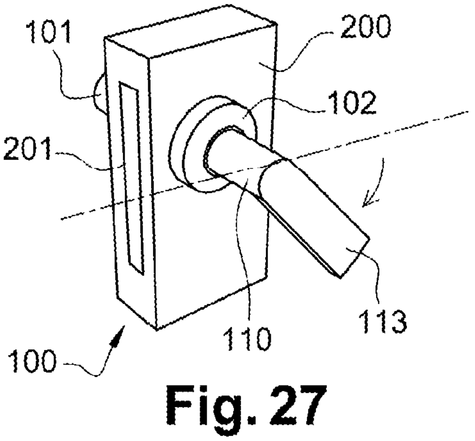
Figure 39:
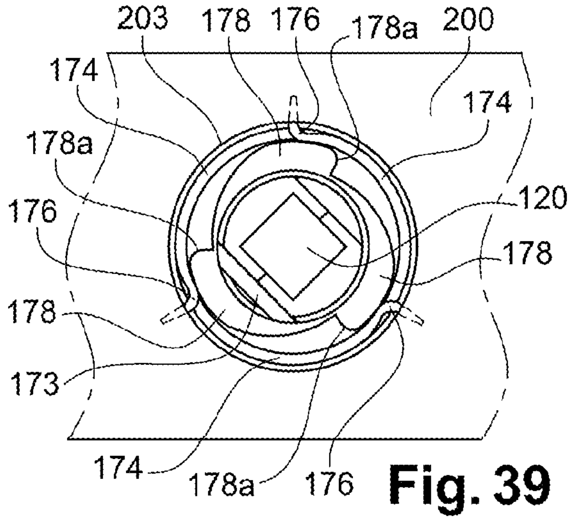

During the first use of the handle 110, the grip portion 113 is substantially inclined at 45° to the horizontal as illustrated in FIG. 27. In this position, the expansion cam 172 is driven so that the latter and in particular the projections 178 press against the spear-shaped ends 176 of the blades 174 which are fully deployed in the aperture 203 of the opening leaf 200, as illustrated in FIG. 39. Once the spears 176 are fully deployed, the first handle 110 is fully secured to the opening leaf 200.

During the return of the grip portion 113 to the horizontal position, the cam 178 is not driven and remains fixed in position, maintaining the spears 176 in anchoring position in the aperture 203.

Figure 28:
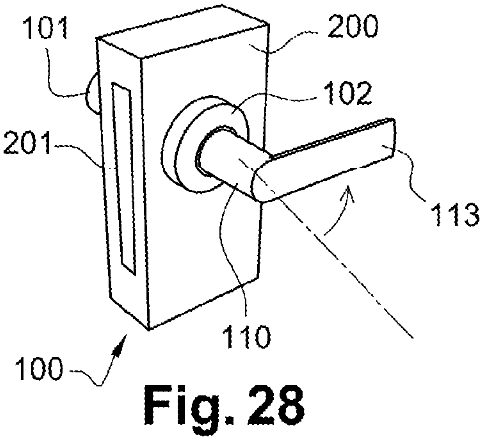
Figure 29:
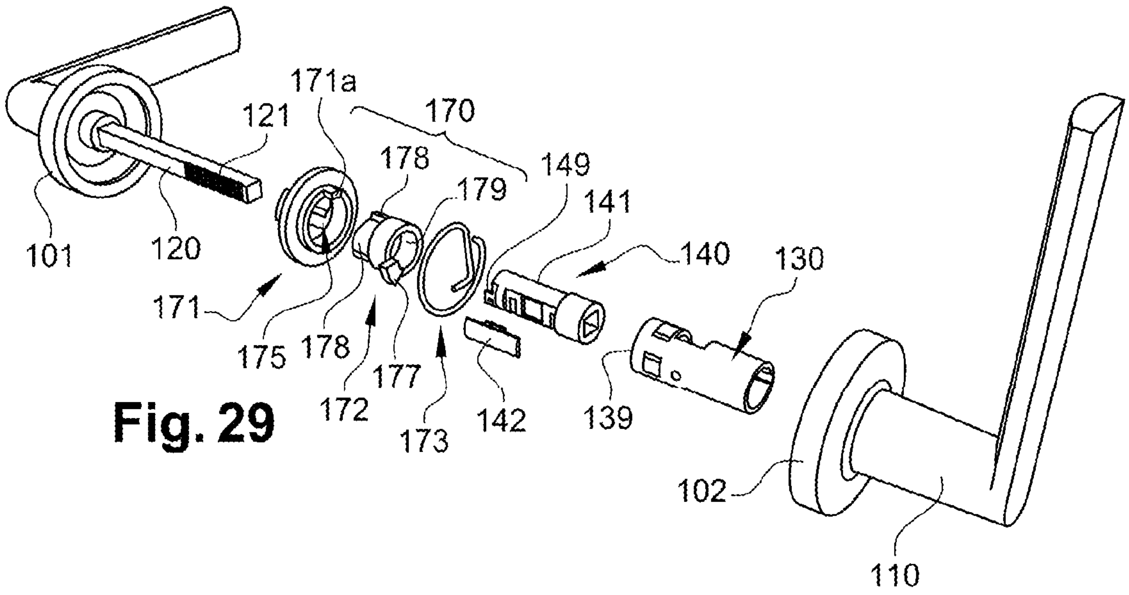
FIG. 29 is an exploded view of a handle assembly according to the first embodiment equipped with a handle return system according to a first embodiment.
Figure 30:
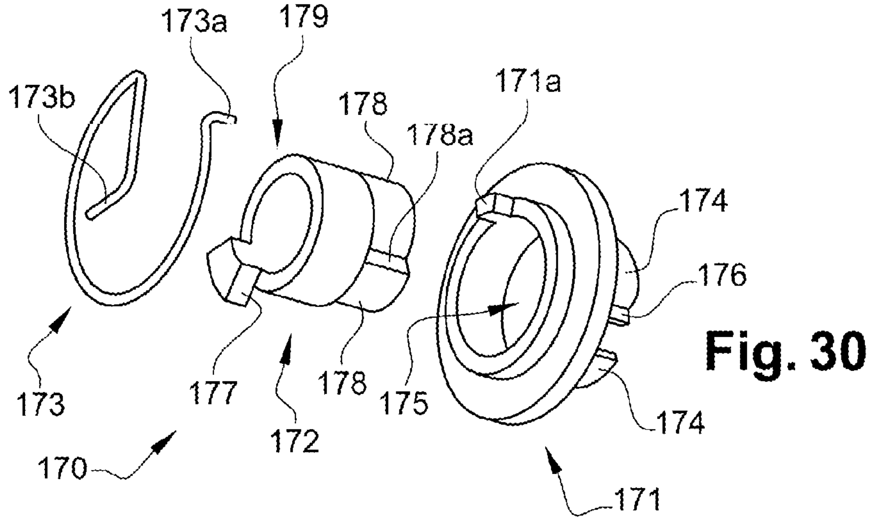
FIGS. 30 and 31 illustrate the parts of the return system shown in FIG. 29, FIGS. 32 to 41 illustrate in detail the mechanism of the handle assembly according to FIGS. 29 to 31 following the steps of the assembly method illustrated in FIGS. 21 to 28.
Figure 31:
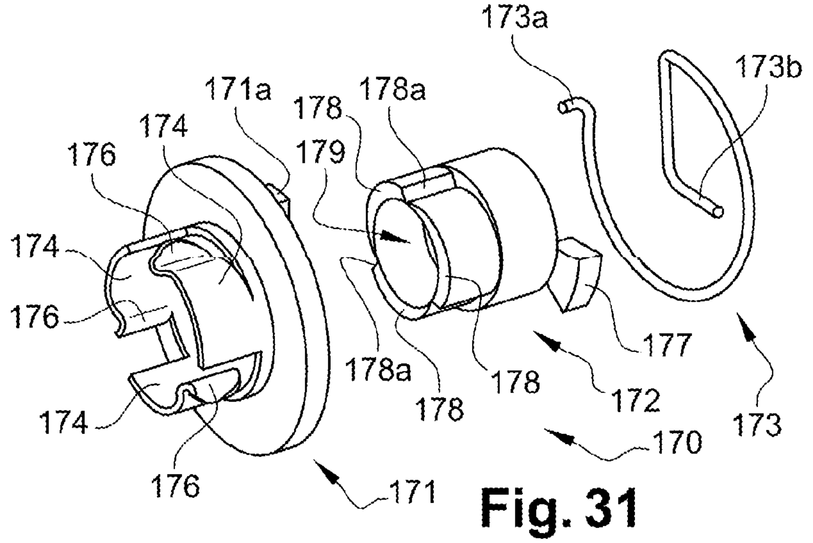
Figure 32:
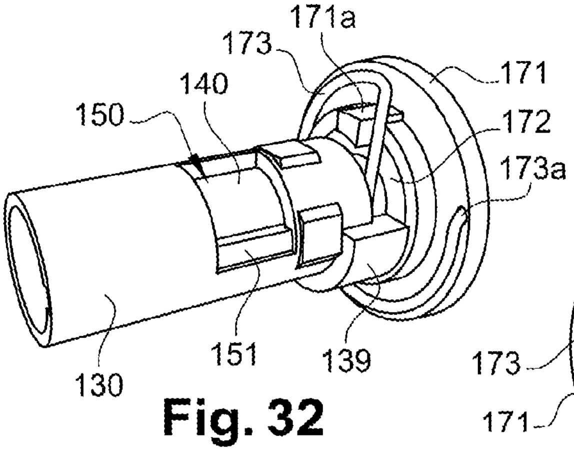
Figure 33:
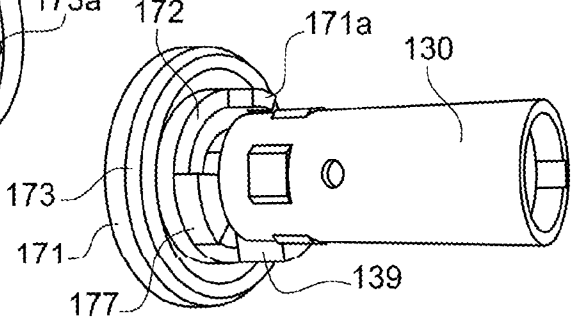
Figure 38:
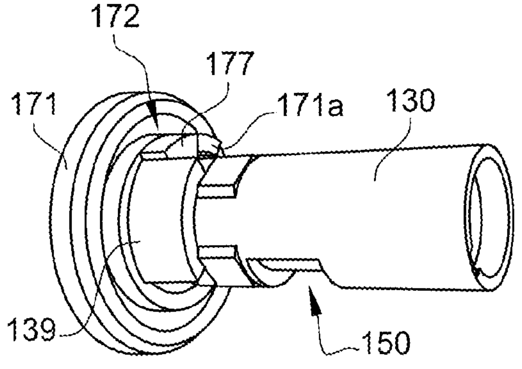
Figure 40:
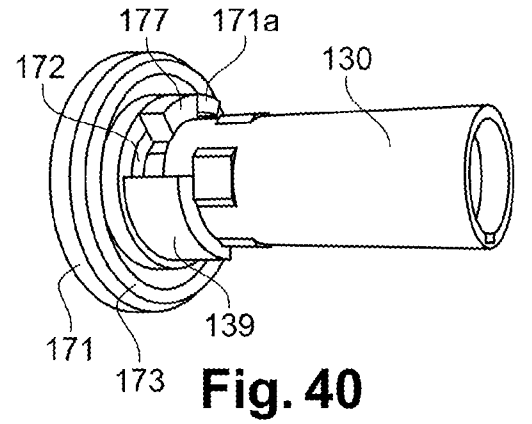
Figure 41:
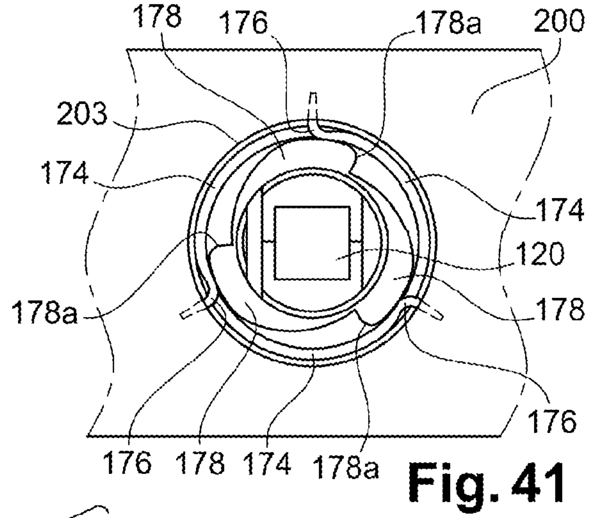
Figure 42:
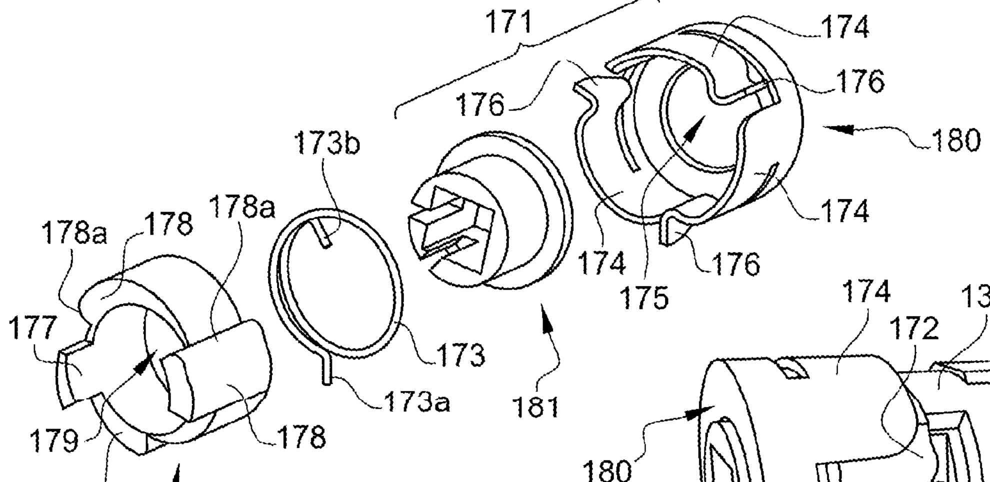
FIG. 42 is an exploded view of a handle assembly according to the first embodiment equipped with a handle return system according to a second embodiment.
Figure 43:
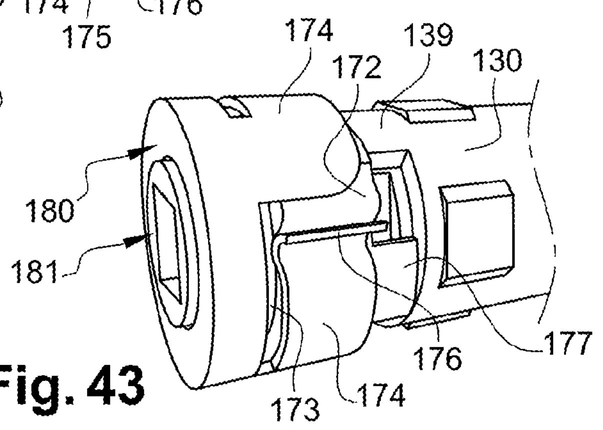
FIG. 43 illustrates the parts of the return system shown in FIG. 42 from another viewpoint.

The first handle 110 is actuated downwards as illustrated in FIGS. 27, 38, 39 i.e. in the same direction of rotation as for the assembly and the deployment of the spears 176. The return system 170 returns the first handle 110 to horizontal position as illustrated in FIG. 28 as illustrated in FIGS. 28, 40 and 41.

In the first embodiment, the expansive base plate 171 is made in a single piece. In addition, the latter 171 comprises an immobilizing pin 171*a* positioned on a face opposite the face having blades 174. The immobilizing pin 171*a* is configured to abut against the drive spur 177 of the expansion cam during the rotation of the first handle 110 as can be seen in FIGS. 38 and 40.

In the first embodiment, the spring 173 only comprises one coil.

In the first embodiment, the blades 174 of the expansive base plate 171 are oriented towards the second handle 101.

In the first embodiment, the solutions implemented aim to make it possible to compensate any possible defects of concentricity between the aperture 203 arranged in the door and the latch mechanism 201 in which the square spindle 120 will be mounted. To this end, the diameter of the cavity 179 is substantially greater than the diameter in which the square spindle 120 lies so as to offer an assembly tolerance. In this first embodiment, the expansive base plate 171 is intended to receive the return spring 173 on an area situated outside the aperture 203. The geometry of the drive pin 177 is provided to allow its actuation by the stop spur 139 in the whole of the permitted tolerance range, which is for example +/−1.6 mm.

In the second embodiment, the return spring function and a catch mechanically reinforcing the hold of the first handle 110 on the opening leaf 200 is directly integrated in the opening leaf aperture 203.

In the second embodiment, the expansive base plate 171 is formed of two separate parts free in rotation one with respect to the other, and connected to one another by the spring 173. Thus the expansive base plate 171 comprises an expanding ring 180 and an attachment hub of the spring 181. The expanding ring 180 is positioned around the attachment hub of the spring 181 in assembled configuration.

In the second embodiment, the blades 174 of the expansive base plate 171 are oriented towards the first handle 110.

In the second embodiment, the end 173*a* of the spring 173 cooperates with a portion of the attachment hub of the spring 181 and the end 173*b* cooperates with the expanding ring 180.

Of course, the invention is not limited to the embodiments described and shown in the attached figures. Modifications remain possible, in particular from the point of view of the constitution of the various elements or by substitution of equivalent techniques, without however exceeding the scope of protection of the invention.

In particular, other modes of securing the base plate with the opening leaf can be envisaged, in particular by making use of principles of the expansion bolt type (Molly bolt for example). In this case the movement of the handle in rotation about the square spindle would drive expansion by screwing compression.

Another mode would consist of carrying out direct screwing of the base plate by means of a suitable thread arranged on the outer body of the tubular portion of the base plate entering the aperture 203 in order to secure the base plate with the opening leaf during the movement in rotation for securing the handle to the square spindle.

Of course, the different characteristics, forms, variants and embodiments of the invention can be combined with one another in various combinations, provided that they are not incompatible or mutually exclusive.

The invention claimed is:

1. A handle assembly intended to be secured on an opening leaf, comprising at least:

a first handle including at least one recess;

a square spindle extending along a longitudinal axis and configured to be housed at least partially in the recess of the first handle;

in an initial configuration, the first handle is configured to slide freely along the longitudinal axis of the square spindle over a given distance; and the first handle is configured to pass from the initial configuration to a securing configuration in which the first handle is immobilized in translation and in at least one direction of rotation with respect to the square spindle, by at least one displacement in rotation of the first handle about the longitudinal axis of the square spindle by an angle strictly less than 360°.

2. The handle assembly according to claim 1, in which the recess comprises an inner wall delimiting an inner volume shaped to receive at least one portion of the square spindle and in which the recess comprises at least one complementary relief arranged in its inner volume, configured to cooperate with a relief of the square spindle which is directly or indirectly arranged on the square spindle.

3. The handle assembly according to claim 2, in which the complementary relief of the recess comprises a rack or a succession of projecting spurs extending longitudinally over at least a portion of the inner volume of the recess.

4. The handle assembly according to claim 2 wherein the recess comprises a rack, a succession of projecting spurs extending longitudinally over at least a portion of the inner volume of the recess, or an insert integrated in the inner volume of said recess, the insert comprising a through hollow delimited by an inner wall, the complementary relief of the recess is arranged on the insert.

5. The handle assembly according to claim 2, the relief of the square spindle integrates the complementary locking member.

6. The handle assembly according to claim 1, in which the recess comprises an insert integrated in the inner volume of said recess, the insert comprising a through hollow delimited by an inner wall.

7. The handle assembly according to claim 6, in which the locking member of the recess is positioned on the insert preferentially on the inner wall of the insert.

8. The handle assembly according to claim 6, in which the inner wall of the insert forms a progressive ramp about an axis of revolution merged with the longitudinal axis along which the insert extends.

9. The handle assembly according to claim 6, in which the recess comprises an adapter shaped to be housed in the insert, said adapter comprises an inner cavity adapted to the shape of the square spindle.

10. The handle assembly according to claim 1, in which the recess comprises at least one locking member configured to cooperate with a complementary locking member in a securing configuration, the locking member being directly or indirectly arranged in the recess.

11. The handle assembly according to claim 10, in which the cooperation between the locking member and the complementary locking member is a cooperation of the bayonet type.

12. The handle assembly according to claim 1, comprising a catch device configured to allow the catching of the first handle to an opening leaf mechanism or to a second handle of the handle assembly.

13. The handle assembly according to claim 12, in which the catch device comprises a pawl, a drive rod of the pawl and a drive pin of the drive rod.

14. The handle assembly according to claim 13, in which the pawl is configured to be mobile between at least two positions:

a passing position in which the pawl is aligned with the square spindle; and a catching position in which the pawl is not aligned with the square spindle and has a projecting shape with respect to said square spindle.

15. The handle assembly according to claim 1, comprising a device for additional securing of a base plate in the opening leaf, said device comprising the base plate configured to be at least partially housed in an opening leaf aperture and at least one locking element configured to immobilize the base plate in translation and in rotation, directly or indirectly, in the opening leaf aperture, by rotation of the first handle in at least one direction of rotation.

* * * * *